United States Patent
Gianfagna

(10) Patent No.: US 10,589,564 B2
(45) Date of Patent: Mar. 17, 2020

(54) CAPACITIVE TOUCH SCREEN COMPATIBLE STYLUS ADAPTOR FOR WRITING INSTRUMENTS

(71) Applicant: Thomas L Gianfagna, Litchfield, CT (US)

(72) Inventor: Thomas L Gianfagna, Litchfield, CT (US)

( * ) Notice: Subject to any disclaimer, the term of this patent is extended or adjusted under 35 U.S.C. 154(b) by 9 days.

(21) Appl. No.: 15/829,972

(22) Filed: Dec. 3, 2017

(65) Prior Publication Data

US 2019/0168532 A1 Jun. 6, 2019

(51) Int. Cl.
*B43K 29/00* (2006.01)
*B43K 29/08* (2006.01)
*G06F 3/0354* (2013.01)

(52) U.S. Cl.
CPC .......... *B43K 29/08* (2013.01); *G06F 3/03545* (2013.01)

(58) Field of Classification Search
CPC ............................ G06F 3/03545; B43K 29/08
USPC ........................................................ 401/195
See application file for complete search history.

(56) References Cited

U.S. PATENT DOCUMENTS

2016/0162055 A1* 6/2016 Fang ....................... G06F 3/041
345/179

FOREIGN PATENT DOCUMENTS

WO WO-2013082761 A1 * 6/2013 ............. G06F 3/044

* cited by examiner

*Primary Examiner* — Jennifer C Chiang

(57) ABSTRACT

An adaptor allows a user to turn any pencil or pen into a capacitive stylus while still allowing it to write on paper. When attached to a pencil, pen or similarly shaped and purposed tool, it gives the tool the added capability of operating electronic devices having a capacitive touch screen. It does this while constantly maintaining the writing instrument's intrinsic capability of marking paper. The main component of the invention comprises a fastener which allows electricity to pass along it while simultaneously allowing the writing utensil tip to be permanently exposed. It can transfer electricity from the user's hand to the touch screen without interfering with the original function or ergonomic shape of the writing instrument. A seamless workflow between surfaces is created since the same end of the writing instrument is used and no other action is required to reveal or conceal its tip.

14 Claims, 38 Drawing Sheets

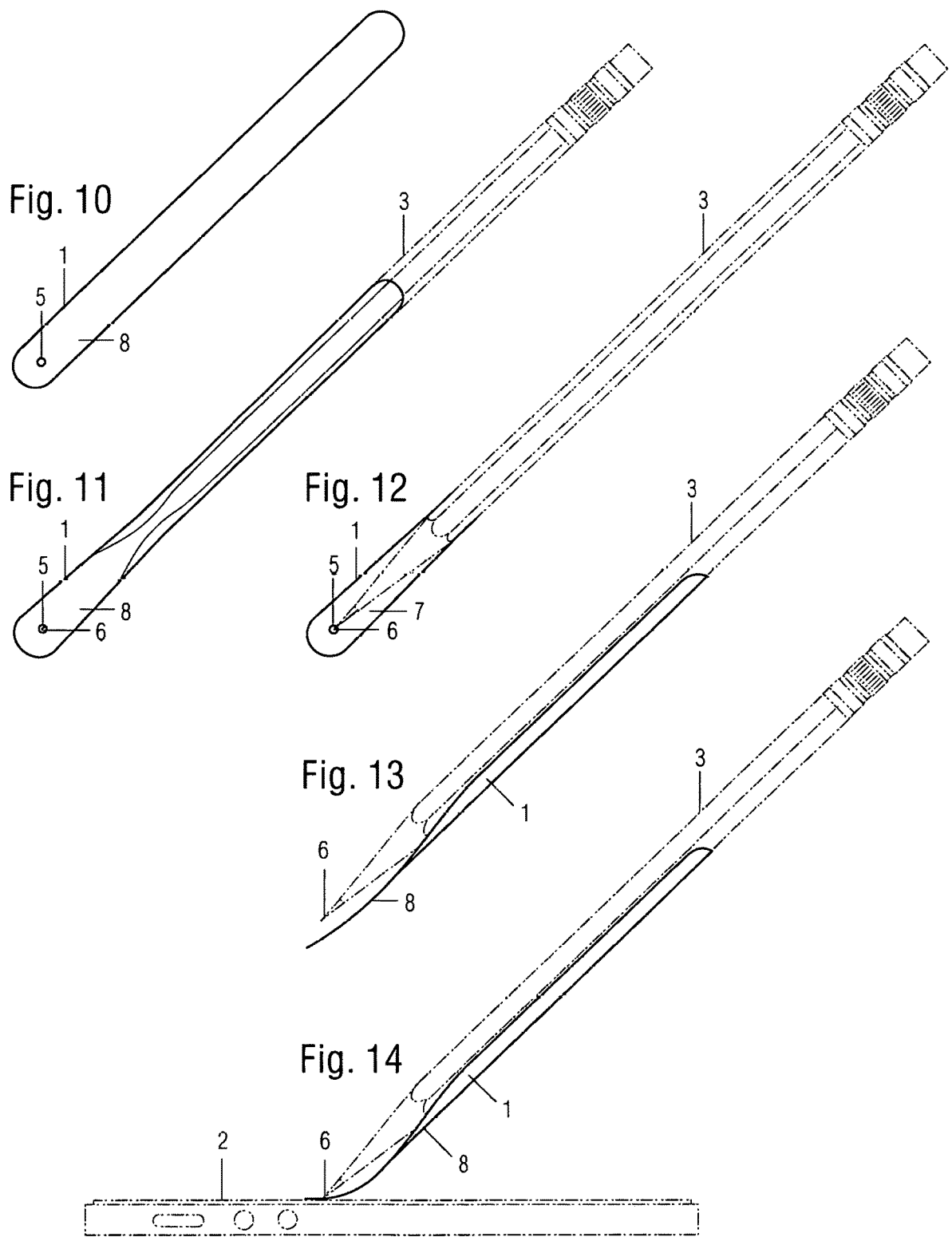

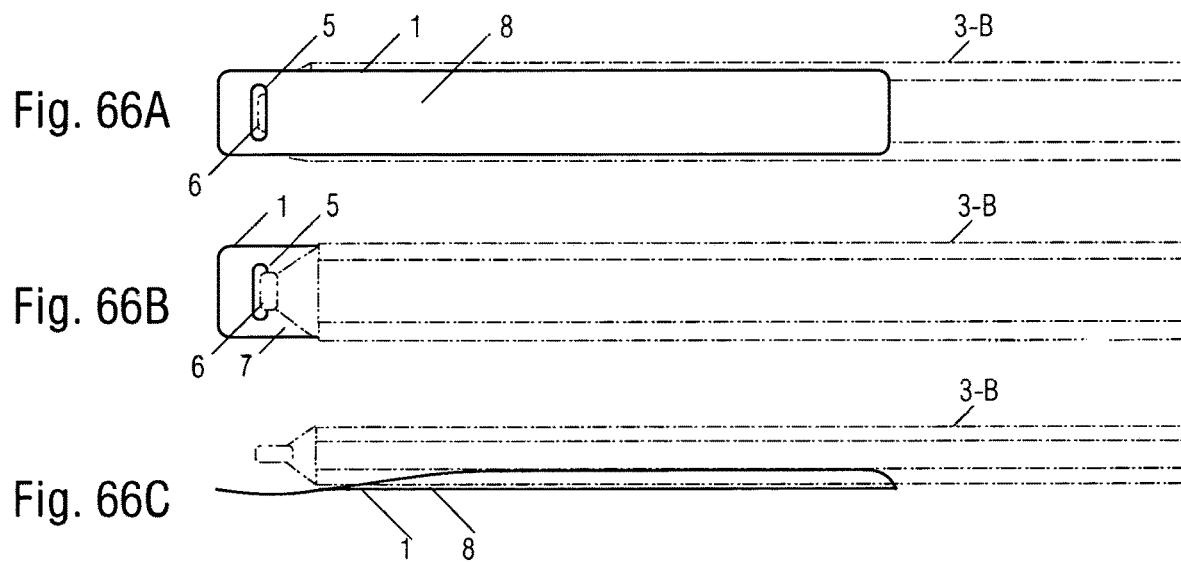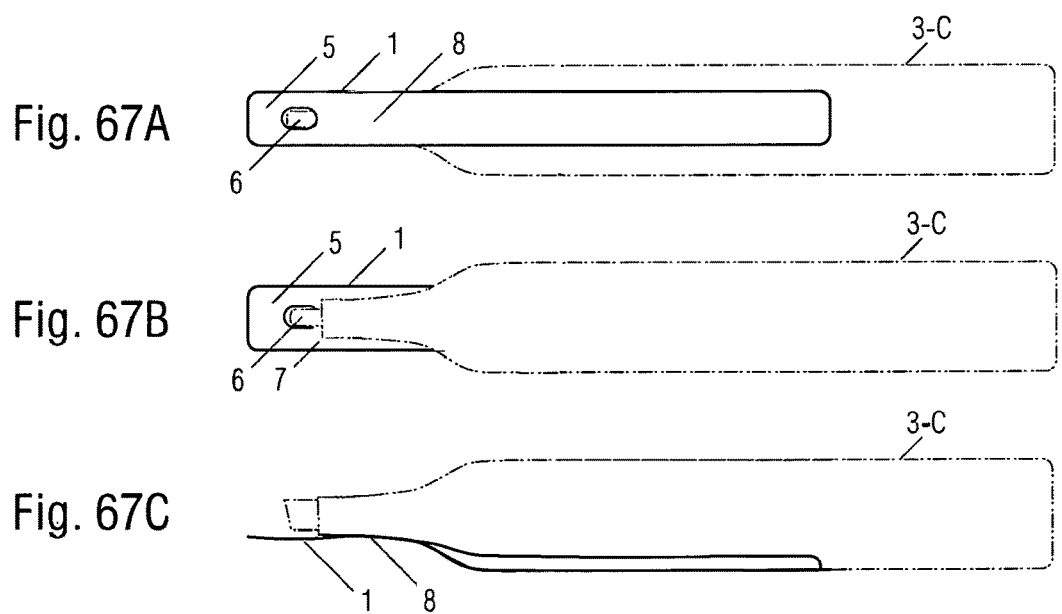

CAPACITIVE TOUCH SCREEN COMPATIBLE STYLUS ADAPTOR FOR WRITING INSTRUMENTS

BACKGROUND OF THE INVENTION

The titled invention relates to peripherals used to operate electronics having touch screens such as capacitive and pressure sensitive screens. It also relates to the combined process and methods of the invention being ordered, made, packaged and distributed.

When there is a need or desire to operate a device having a capacitive touch screen without directly touching it with one's finger, a stylus can be used. Often, a device such as a mobile phone or tablet is used at the same time as pen or pencil and paper. So, when a stylus is preferred to operate a device and a pencil or pen is needed to write on paper, two types of instruments are needed for the two types of tasks. Accordingly, it is desirable if these instruments could be combined so as to reduce the number of instruments needed to just one yet sill accomplish both types of tasks. This would eliminate unnecessary and repetitive movement of the hand such as putting down one instrument and then picking up another or having to repetitively reposition the writing instrument in the hand so as to free a finger in order to operate a capacitive touch screen and vice versa.

BRIEF SUMMARY OF THE INVENTION

The disclosure relates to an apparatus for adapting a writing instrument (i.e. a pen or pencil) or similarly shaped non-writing and non-electrically conductive instrument into a stylus for operating an electronic device having a capacitive touch screen. It also allows a writing instrument to simultaneously maintain its original capability of writing or drawing on paper. For example, one embodiment comprises: A thin, flexible strip; An adhesive surface or shape that can attach itself to a writing instrument; A conductive surface; One opening which penetrates the complete depth of the strip and has a diameter large enough to receive the tip of the writing instrument.

Other benefits include the ability of the adaptor to be removed and replaced (i.e. when used with a pencil that needs re-sharpening), removed and placed onto a different writing instrument or removed permanently without harming or altering the writing instrument.

In one embodiment, the adaptor is a thin adhesive strip formed of a flexible material and with a thickness that renders the strip pliable. The strip adheres to and conforms with the configuration of the writing utensil. One end of the adaptor extends beyond the writing portion of the utensil and can bend to cover the writing portion when desired.

Due to the thinness of some of the embodiments, the adaptor can be stored fully concealed between a mobile electronic touch screen device and its protective case. Some are also thin enough to fit inside a wallet, book or notebook. Due to the combination of adhesive backing and thin profile, some embodiments can be temporarily adhered to the back or side of other objects (i.e. a mobile phone or book jacket) for storage until future use without interfering with the ergonomics of the object. The adaptor can also be stored on the writing instrument itself simply by repositioning it further up the instrument and away from its tip.

Due to the flexibility of materials used to make some of the embodiments, the adaptor is capable of silent operation on a capacitive surface (i.e. no tapping sound when the adaptor strikes the screen of the device).

In another embodiment, the adaptor is formed of a generally rigid material with sufficient resilience for connection with the writing utensil via a snap-on or slide-on connection. The lower end of the adaptor comprises a flexible material (or a generally rigid material made flexible with living hinges) which can be bent to cover the writing portion of the writing utensil.

The materials used in the manufacture and packaging for retail display, labeling and shipping can be the same. As one all-encompassing flat unit, it can be mailed or shipped without the help of any other material or packaging.

BRIEF DESCRIPTION OF THE DRAWINGS

Other objects and advantages of the invention will become apparent from a study of the following specification when viewed in the light of the accompanying drawing, in which:

FIG. 10 is a top view of the adaptor similar to FIG. 2 but arranged in a writing position;

FIGS. 11, 12, and 13 are views similar to FIGS. 7, 9, and 5, respectively, but arranged in a writing position;

FIGS. 14 and 15 are side views showing the adaptor pressed against a capacitive touch screen;

FIGS. 66(a)-(c) are bottom, top, and side views, respectively of an alternate embodiment of an adaptor for a writing instrument;

FIGS. 67(a)-(c) are bottom, top, and side views, respectively of an alternate embodiment of an adaptor for a writing instrument;

DETAILED DESCRIPTION OF THE INVENTION

Figure 1:
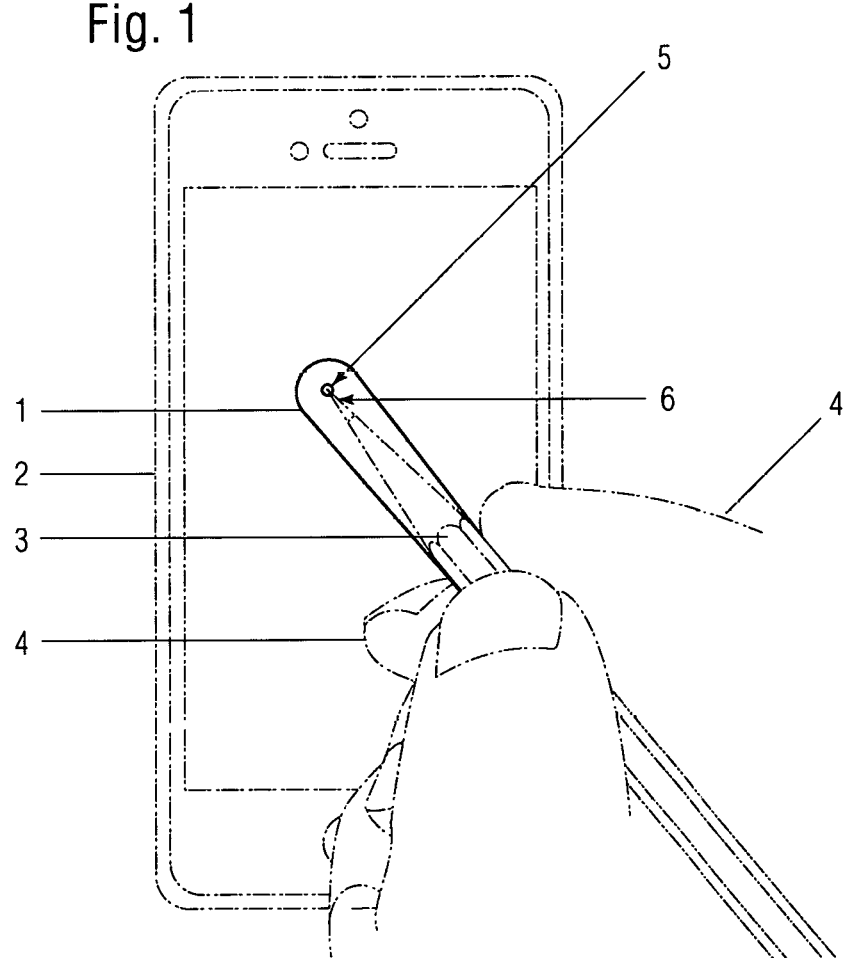
FIG. 1 is a plan view of the adaptor according to a preferred embodiment of the invention mounted on a writing instrument and used in connection with a mobile device.

FIG. 1 illustrates an overhead view of the basic embodiment of the invention 1 in use with a mobile device having a capacitive touch screen 2. In this example, it is attached to a pencil 3 in a position so when held by a user makes contact with the user's fingers 4. This allows the natural electricity of the user's fingers 4 to flow through the conductive surface of the adaptor 1 and operate the capacitive touch screen device 2. Also shown in this illustration of the basic embodiment of the invention 1 is the opening at its tip 5, which is to align with the tip of the writing instrument 6.

Figure 2:
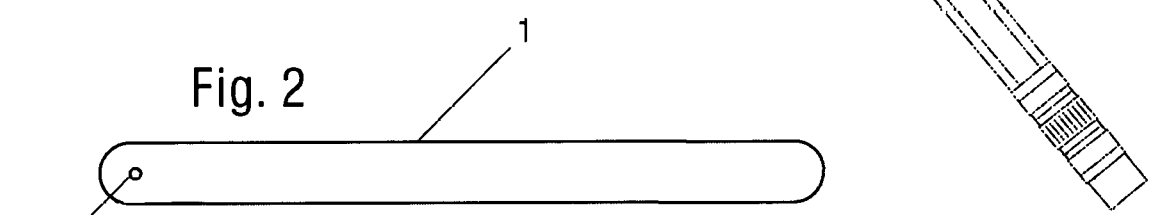
FIGS. 2 and 3 are top and side plan views, respectively of the adaptor of FIG. 1.

FIG. 2 is an illustration of the top view of the basic embodiment of the invention and the opening 5 near its end.

Figure 3:
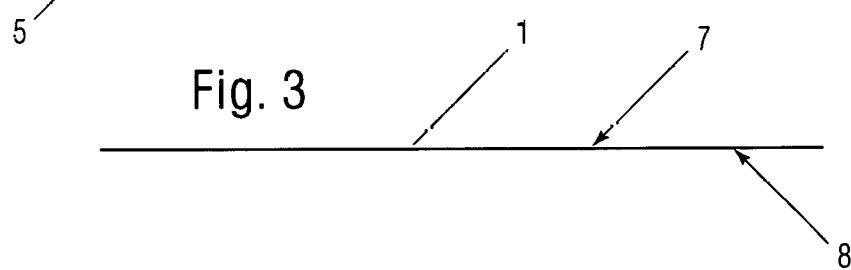

FIG. 3 shows the profile of the basic embodiment of the invention 1 is thin and flat. By way of example only, the stylus adaptor 1 has a total thickness of all layers to be in the range of 0.002" to 0.125", a length in the range of 0.5" to 9" and a width in the range of 0.0125" to 1.5".

According to a basic embodiment of the invention, a thin, flexible pre-formed or pre-folded or flat strip forms the stylus adaptor 1 that can attach itself to a common writing instrument 2. The adaptor 1 has a conductive surface 7 and an opening at or near the end which, when attached to the side of a common writing instrument (i.e. a pencil or pen) allows the writing tip to pass through the opening 5 allowing the instrument 3 to function normally (i.e. by writing 15 on paper 14). At the same time, the adaptor 1 functions as a stylus used for the operation of an electronic device having a capacitive touch screen (i.e. such as a mobile phone) 2 by allowing electricity from the user's fingers 4 to flow through the adaptor so to be sensed by the electronic device 2 and allowing for its operation.

In addition, the adaptor 1 maintains the ability of the writing instrument 3 to function normally (i.e. capable of writing on paper) without the user having to adjust, rotate or turn around the instrument 3 in his/her hand in any way. In other words, the thinness of the adaptor 1 as shown in FIG. 3 and the opening near the tip 5 for the point of the writing instrument 6 to pass means that the user does not need to change his/her grip 4 of the writing instrument 3 when either writing or drawing 13 on paper 14 or when operating a device with a capacitive touch screen 2.

Other benefits include the ability of the adaptor 1 to be removed and replaced (i.e. when used with a pencil 3 that needs re-sharpening), removed and placed onto a different writing instrument or removed permanently without harming or altering the writing instrument 3.

Figure 4:
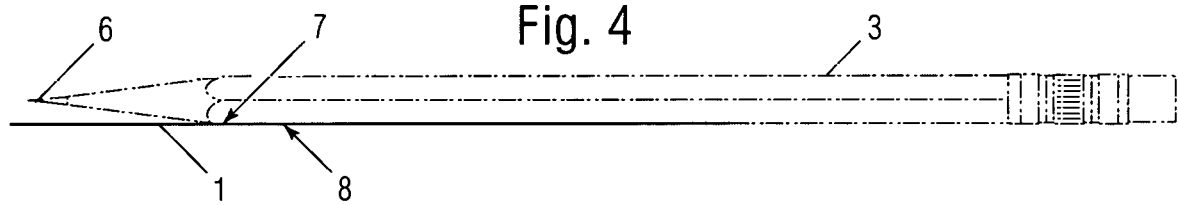
FIGS. 4 and 5 are side views of the adaptor with a writing instrument resting on it in unattached and attached conditions, respectively.

FIG. 4 shows a side view of the adaptor 1 with the writing instrument 3 resting unattached on top of the adaptor 1.

Figure 5:
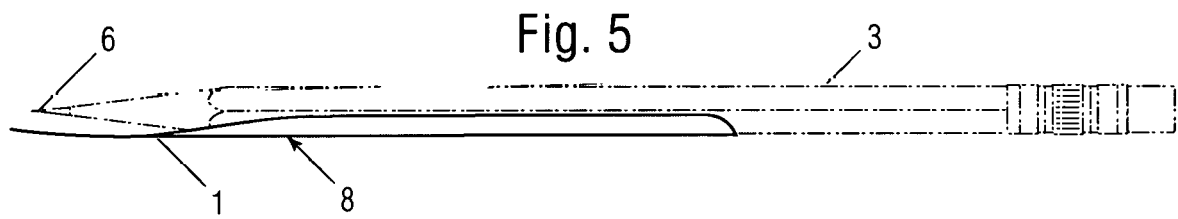

FIG. 5 illustrates a side view of the basic embodiment of the adaptor 1 when attached to the writing instrument 3.

Figure 6:
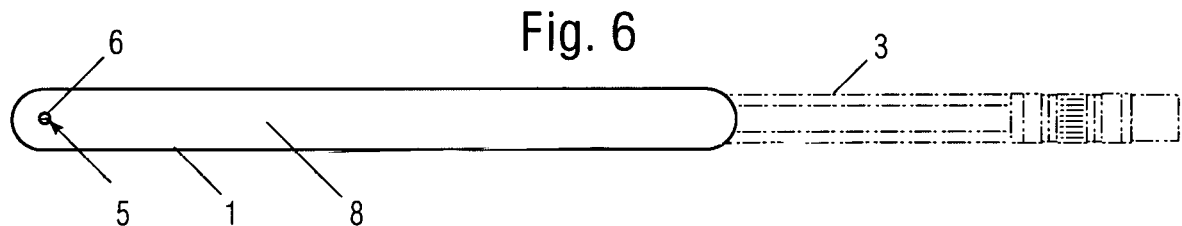
FIGS. 6 and 7 are bottom views of the adaptor with a writing instrument resting on it in unattached and attached conditions, respectively.

FIG. 6 illustrates a bottom view of the basic embodiment of the adaptor 1 when resting unattached on the writing instrument 3.

Figure 7:
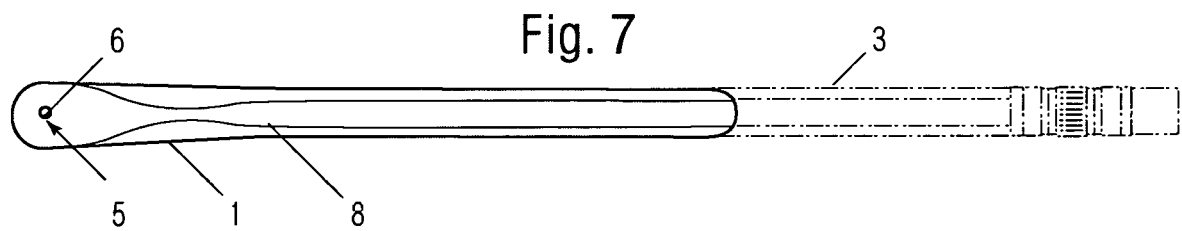

FIG. 7 illustrates a bottom view of the basic embodiment of the adaptor 1 when attached to the writing instrument 3.

Figure 8:
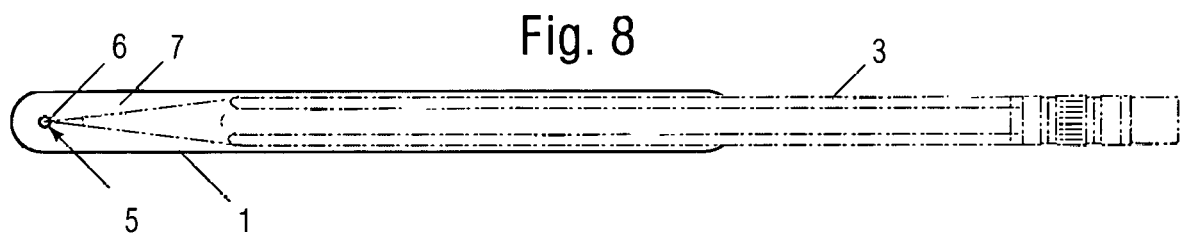
FIGS. 8 and 9 are top views of the adaptor with a writing instrument resting on it in unattached and attached conditions, respectively.

FIG. 8 shows a top view of the adaptor 1 with the writing instrument 3 resting unattached on top of the adaptor 1.

Figure 9:
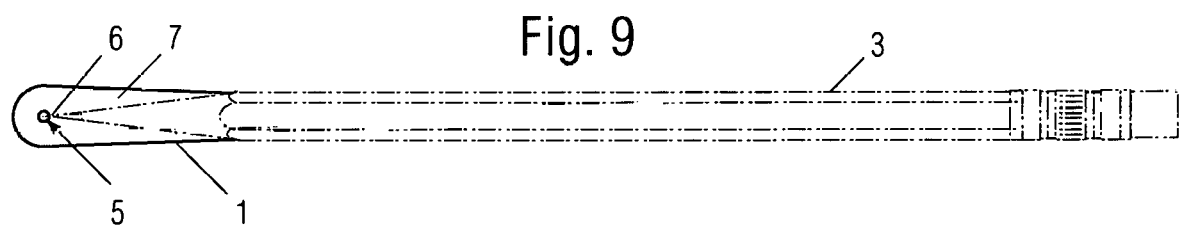

FIG. 9 illustrates a top view of the basic embodiment of the adaptor 1 when attached to the writing instrument 3.

FIG. 10 illustrates a top view of the basic embodiment of the adaptor 1.

Figure 15:
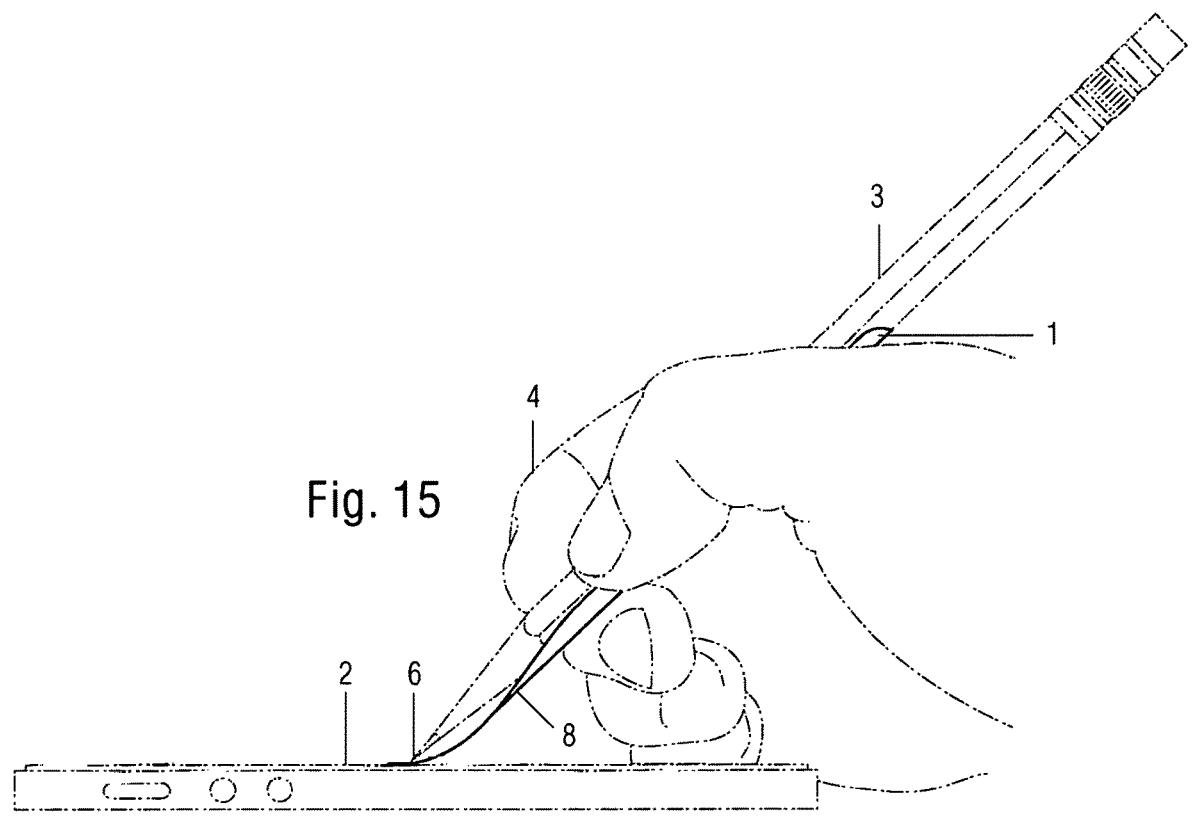

FIG. 11 is the same as FIG. 7 but orientated on the page to match the angle of the writing instrument 3 as seen in FIG. 14 and FIG. 15.

FIG. 12 is the same as FIG. 9 but orientated on the page to match the angle of the writing instrument 3 as seen in FIG. 14 and FIG. 15.

FIG. 13 is the same as FIG. 5 but orientated on the page to match the angle of the writing instrument 3 as seen in FIG. 14 and FIG. 15.

FIG. 14 shows when the adaptor 1 is attached to the writing instrument 3 and pressed against a flat surface such as a capacitive touch screen 2 the adaptor 1 flexes mimicking the curvature of the tip of a human finger. At the same time, because of this curvature 8 and the opening 5 of the adaptor 1, the writing instrument 3 can also still serve as an accurate resistive-type stylus for a device having a resistive touch screen.

FIG. 15 illustrates when the adaptor 1 is attached to the writing instrument 3 and held in the user's hand 4 and pressed against a flat surface such as a capacitive touch screen 2 the adaptor 1 mimics the curvature, 8 rigidity and spring of the tip of a human finger (i.e. returning to its original shape as seen in FIG. 13).

Figure 16A:
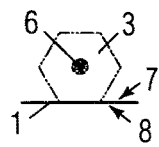
FIGS. 16(a)-(d) are front views showing the sequence of steps, respectively, for connecting the adaptor to a writing instrument.
Figure 16B:
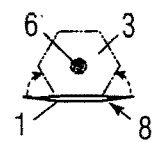
Figure 16C:
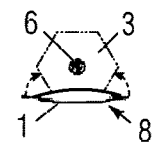
Figure 16D:
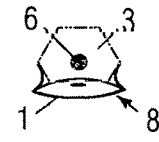

FIGS. 16(a)-(b) show front views of one embodiment of the adaptor 1 as if being applied to the writing instrument 3.

Figure 17:
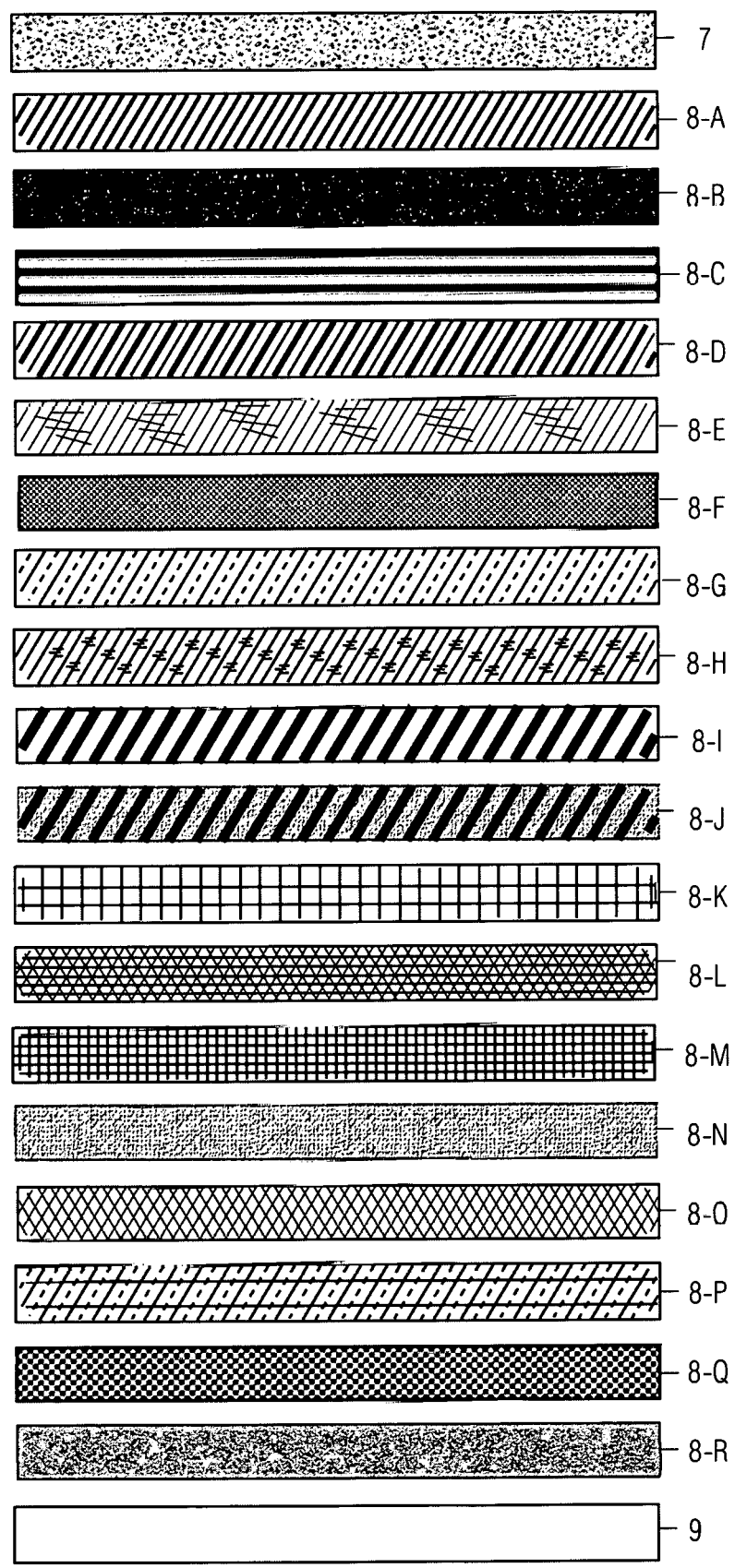
FIG. 17 shows the various materials used to manufacture the adaptor according to FIGS. 2 and 3.

FIG. 17 shows materials 7, 8-A through 8-R and 9 (all of which could be made sterile, i.e. for use hospitals) that could be used to construct the adaptor 1. By way of example only, layer 7 is a non-conductive adhesive. Layers 8-A, B, and C are solids, membranes, or aggregates that are conductive. Examples for a metal layer 8-A include aluminum, silver, zinc, copper and gold. Examples for carbon layer 8-B include graphene, "bucky paper", and penta-graphene. Examples for conductive ceramics or glass layer 8-C include graphene reinforced ceramics and electro ceramics.

The next layers include solids, solid solutions, or byproducts of solid solutions which are coated, treated or impregnated with conductive material. By way of example, silicone, synthetic resin, plastic or indium tin oxide can be used for layer 8-D, wood, wood by-products, and wood veneers can be used for layer 8-E, glass or ceramic may be used for layer 8-F, transparent plastic, silicone, synthetic resin or glass may be used for layer 8-G, cork may be used for layer 8-H, natural or synthetic rubber may be used for layer 8-I and foam or sponge rubber may be used for layer 8-J.

The next layers include metal mesh, fabric or fiber for layer 8-K and conductive ceramic or glass mesh, fabric or fiber for layer 8-L.

Additional layers of non-conductive mesh, fabric, fiber or leather that are treated, coated or impregnated with conductive material may be used for the next layers. For example, layer 8-M may be formed of synthetic resin, plastic or glass mesh, fabric or fiber whereas layer 8-N may be formed of leather, paper, or cloth made of cotton, wool or other natural or synthetic fibers.

Additional layers of metal foil, film or leaf such as gold, silver, aluminum and copper, indium tin oxide may be used for layer 8-O and synthetic resin, plastic or glass with an added conductive foil, ink, chemical, film, or leaf may be used to cover or partially cover the surface of layer 8-P.

Layer 8-Q may be treated with liquids that are conductive or cured or treated to become conductive. These include conductive adhesive, ink and epoxy.

Layer 8-R includes powders and glitters that are conductive or cured or treated to become conductive including metal powder, metal glitter or synthetic resin or plastic powder or glitter.

Layer 9 is a removable paper or film protecting adhesive layer.

Figure 18:
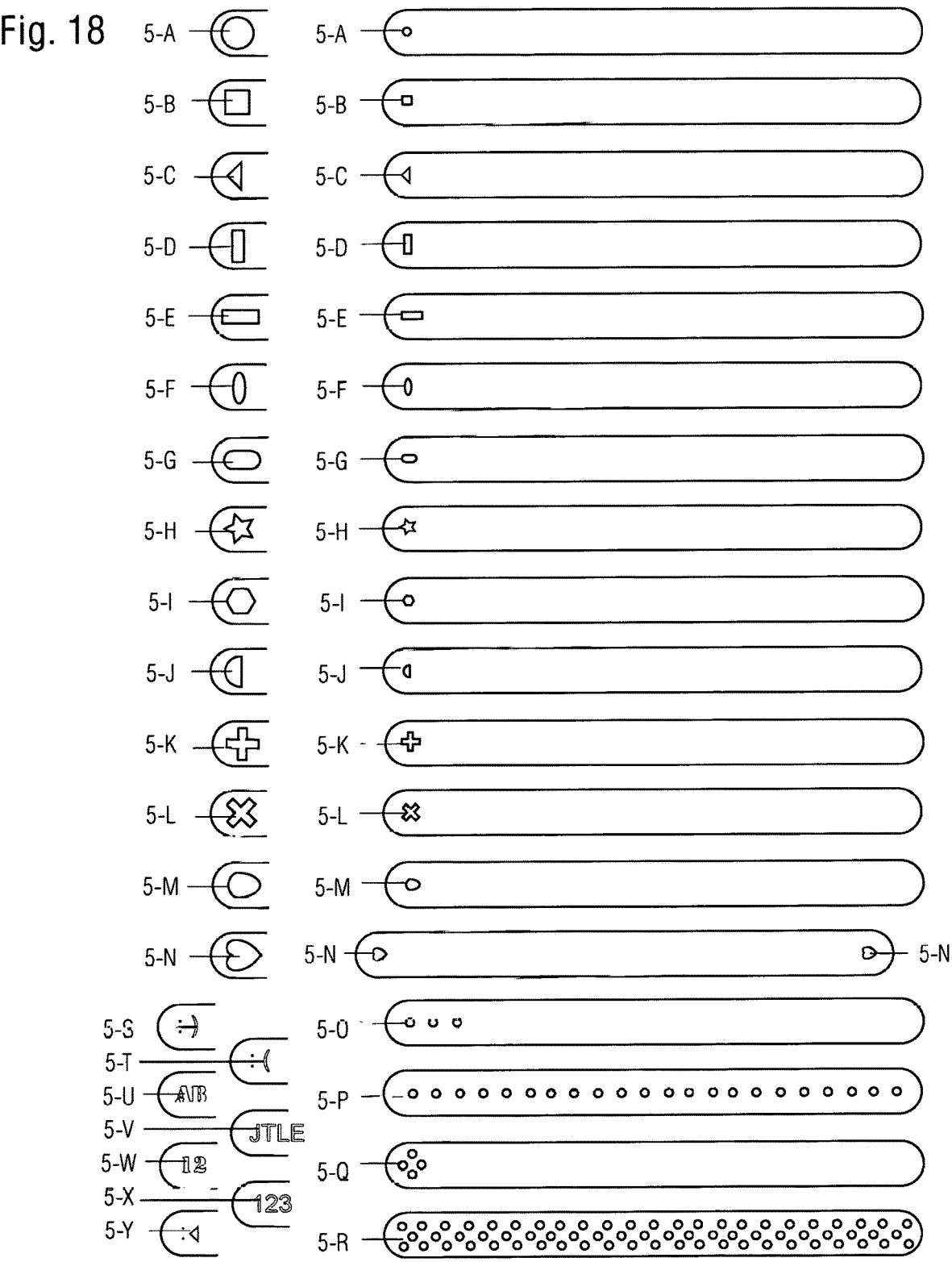
FIGS. 18 and 19 show alternate configurations for an opening in one end of the adaptor.

FIG. 18 shows examples of some different possible types of openings 5 and 5-A through 5-R near the tip of the basic embodiment of the adaptor 1 and how they could be made small or large, at both ends as seen in 5-N, repeated across the length of the adaptor 1 as seen in 5-P or grouped as seen in 5-Q or grouped and repeated across the entire length as seen in 5-R. Other types of openings can be common punctuation, letterforms, numbers 5-S through 5-Y or a combination of these or any other type of opening design such as 5-A through 5-R.

Figure 19:
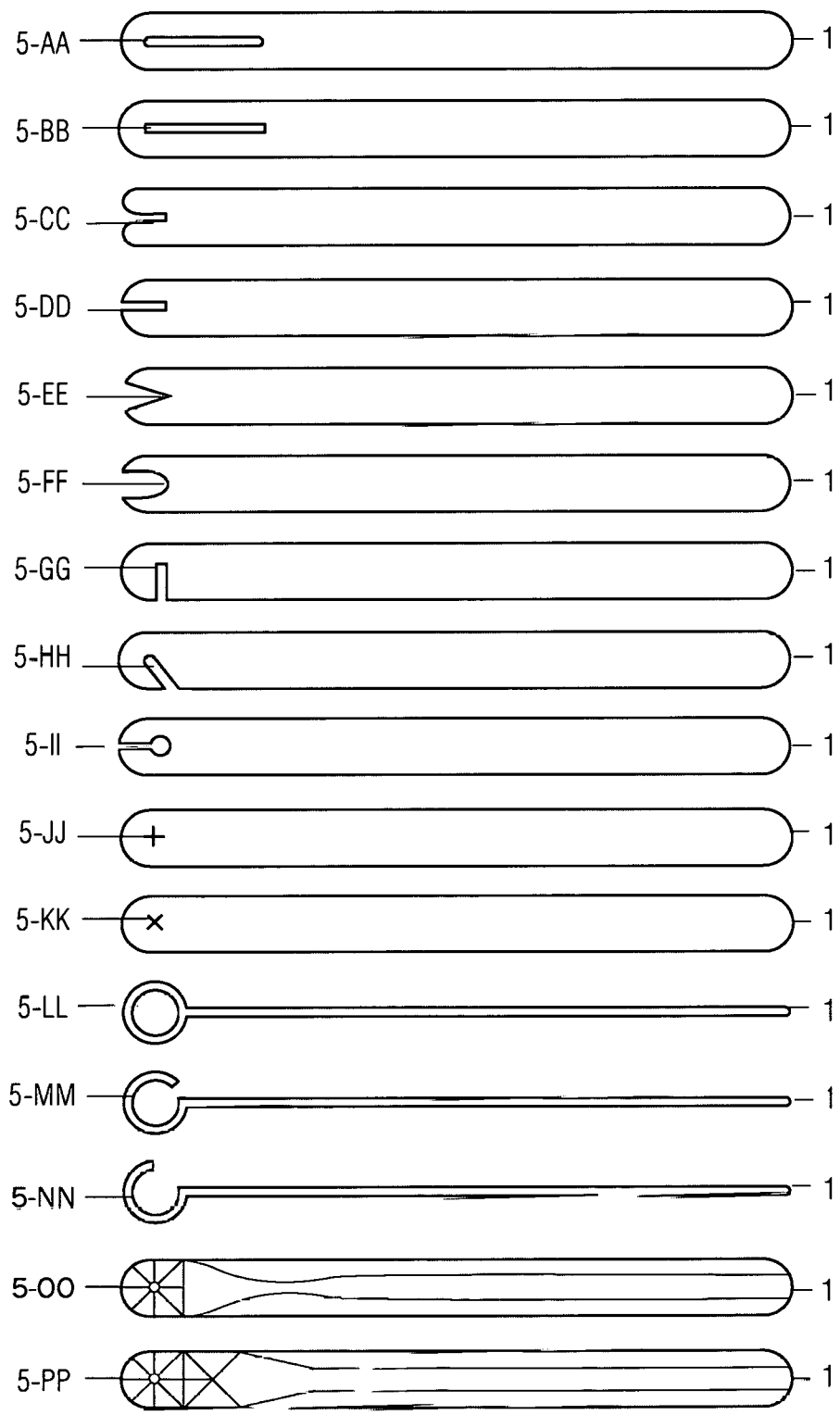

FIG. 19 shows example of different possible types of openings 5 for example: 5-AA and 5-BB show openings 5 that are elongated; 5-CC through 5-11 show those that extend past the edge of the adaptor 1; 5-JJ and 5-KK show cuts that can be made into openings 5 by the user when pushing the tip of the writing instrument 6 through them to complete the opening; 5-LL through 5-NN show thin bodies 1 with hooks or loops at the end and 5-OO and 5-PP show openings centered within radiating grooves 5 which provide flexibility to the adaptor 1.

Figure 20:
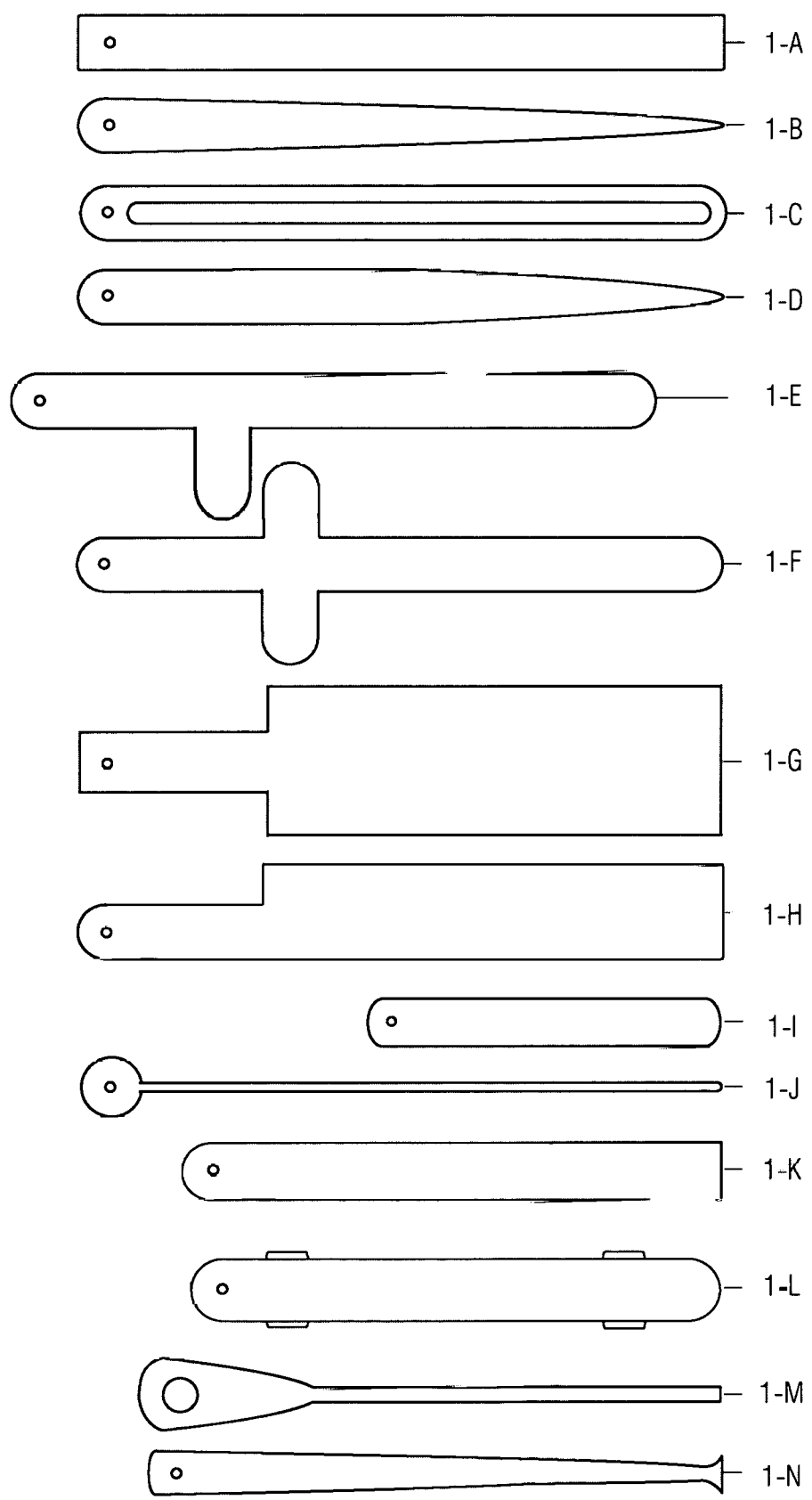
FIGS. 20 and 21 show alternate configurations for the adaptor.

FIG. 20 illustrates embodiments having different overall shapes for example 1-A through 1-D and 1-E through 1-H which show extensions of the sides and 1-I which shows a smaller overall size and 1-J that shows a narrow body and 1-K through 1-M which show shapes to resemble common objects such as a cigar 1-K, skateboard 1-L, lacrosse stick 1-M and baseball bat and ball 1-N.

Figure 21:
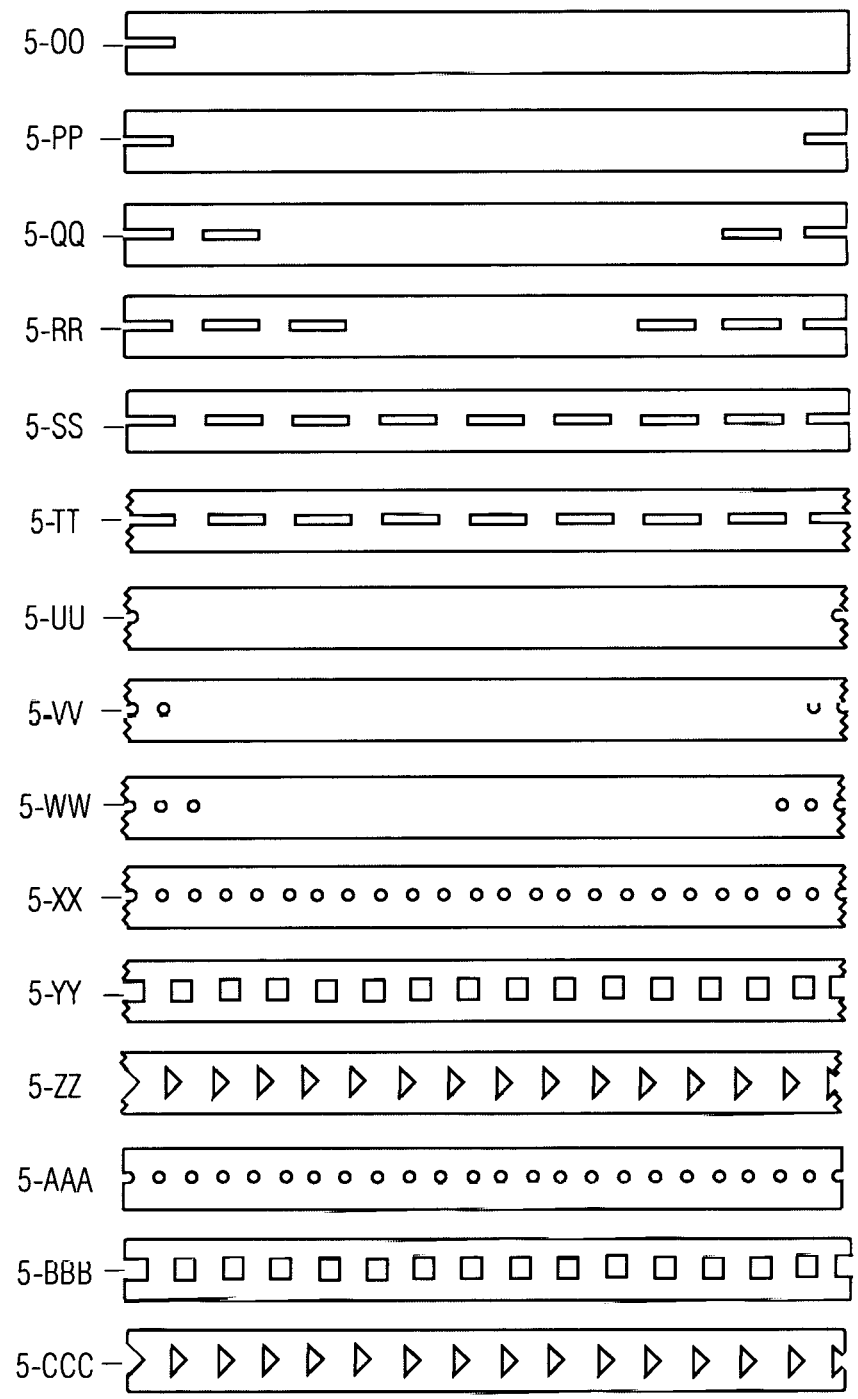

FIG. 21 shows various examples of embodiments of the adaptor based on the body shape 1-A. For example, 5-OO has just one opening of type 5-E. In another example, 5-PP shows having opening type 5-E at both ends. In 5-QQ through 5-SS, repeated opening types 5-E in different combinations from two as seen in 5-QQ or three openings 5-RR or to as many as the length may allow, for example, 5-SS. Examples 5-TT through 5-ZZ show the same as 5-OO through 5-SS but with different opening shapes such as 5-A, 5-B and 5-C and when manufactured on a roll as seen in FIG. 22 through FIG. 25 intended for the end user to tear off individual embodiments of the adaptor 1 or peel away from a protective backer 9 as seen in FIG. 22. 5-AAA through 5-CCC show other examples of opening types such as 5-A, 5-B and 5-C on the same type of body type 1-A that are manufactured on a roll as seen in FIG. 22 through FIG. 25 but are die-cut or kiss-cut to separate individual adaptors 1 from each other as do the examples shown in 5-OO through 5-SS.

Figure 22:
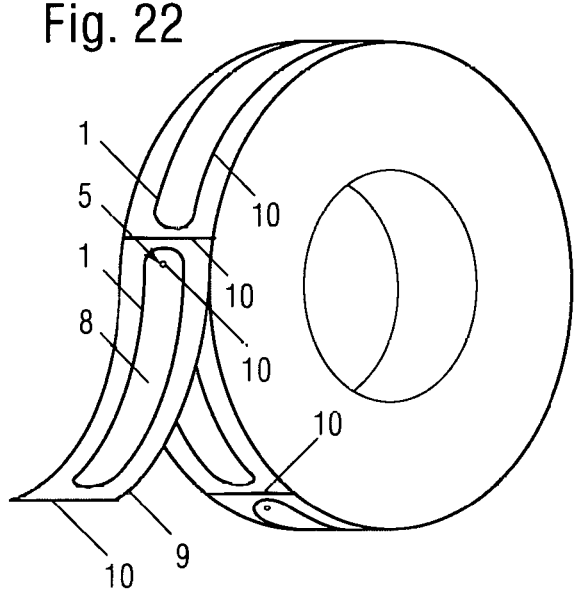
FIGS. 22-25 show alternate rolls of material, respectively, from which adaptors according to the invention are formed.

FIG. 22 also shows that embodiments of the adapter 1 can be produced in rolls using traditional and digital die-cutting methods, for example, kiss-cutting 10 as single units.

Figure 23:
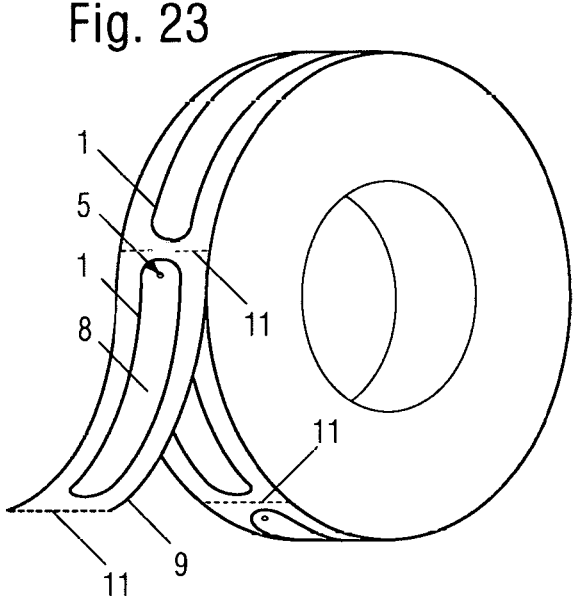

FIG. 23 shows the same as FIG. 22 but with die-cut perforations 11 between the individual units to be torn off by a retailer or the consumer.

Figure 24:
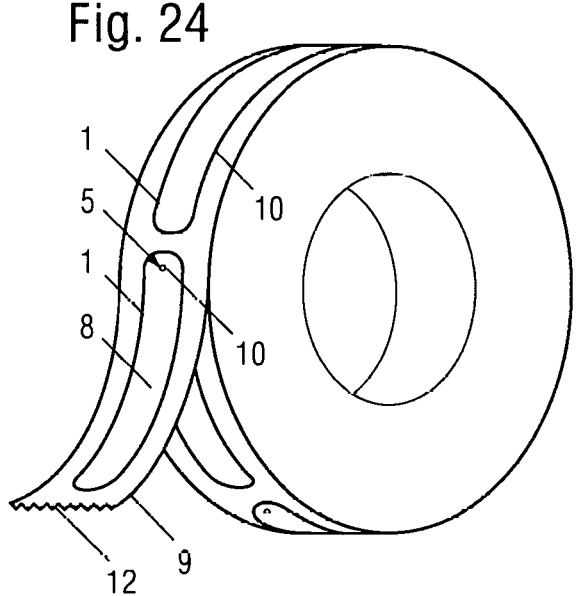

FIG. 24 shows the same as FIG. 22 but without die-cut perforations or kiss-cuts made between the individual units comprising an embodiment of the adaptor such as 1-A with a protective backer 9 requiring a retailer or the consumer to tear it off.

Figure 25:
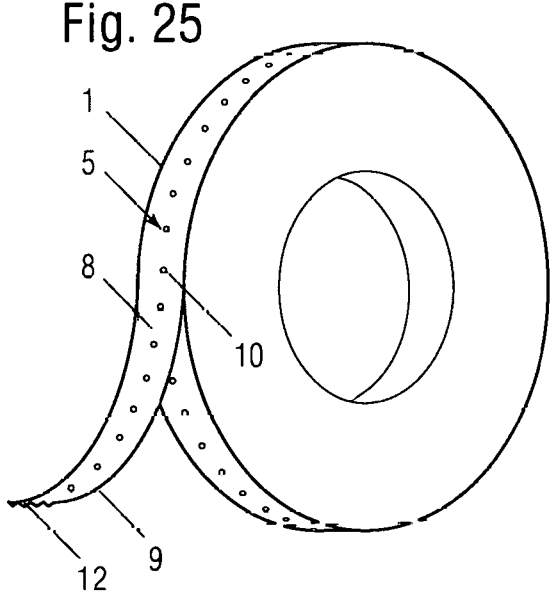

FIG. 25 shows a thinner roll as seen in FIG. 22 but with one embodiment of the adaptor 1-A with traditional or laser die-cuts or kiss-cuts of a repeated opening throughout the length of the roll 5-XX which requires a retailer or the consumer to tear off each unit.

Figure 26:
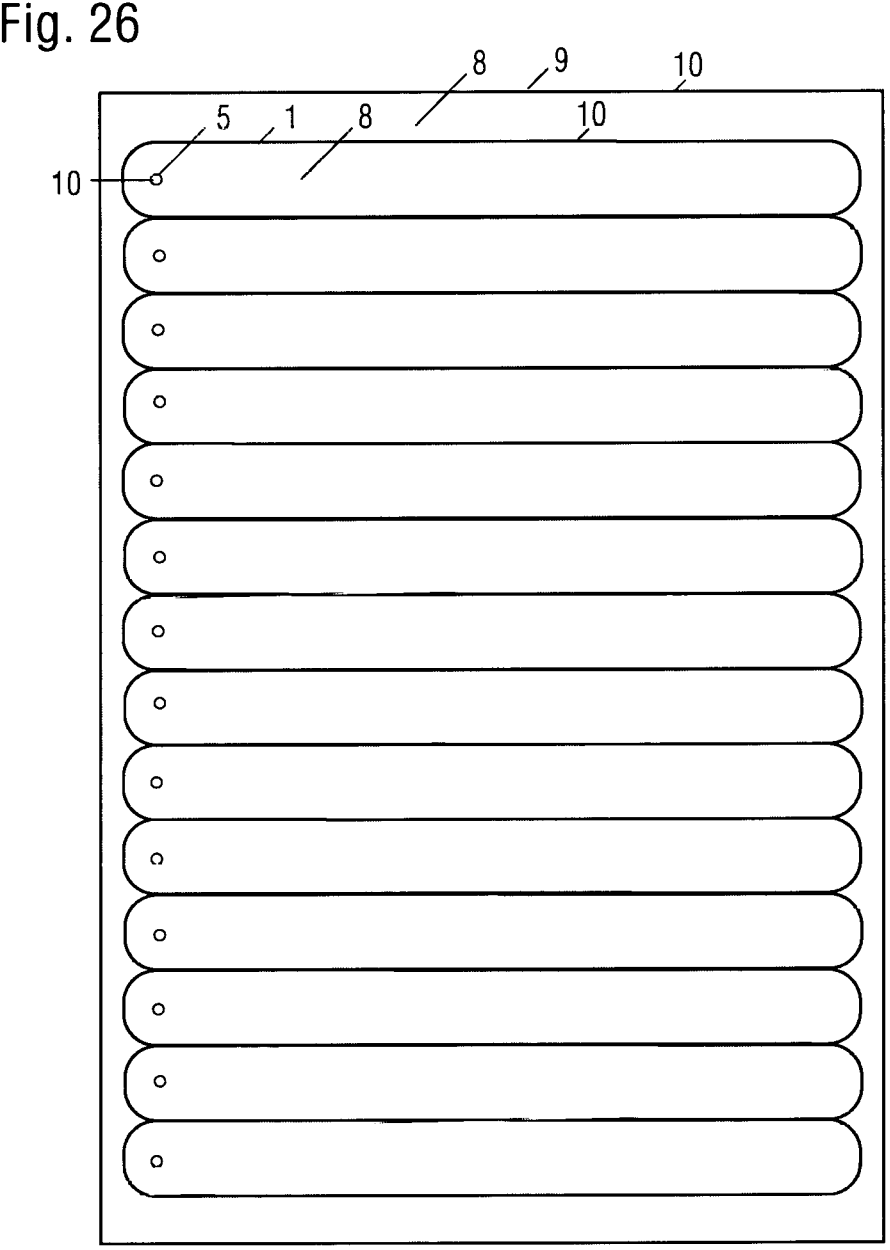
FIGS. 26-41 show alternate sheets of material, respectively, from which adaptors according to the invention are formed.

FIG. 26 shows an example of how embodiments of the adaptor such as 1-A can be manufactured as sheets with the adaptor 1 repeated side-by-side on the same protective backer 9 in various numbers or groups depending on the size of the protective backer 9 for example, one the size of 4" wide by 6" tall.

Figure 27:
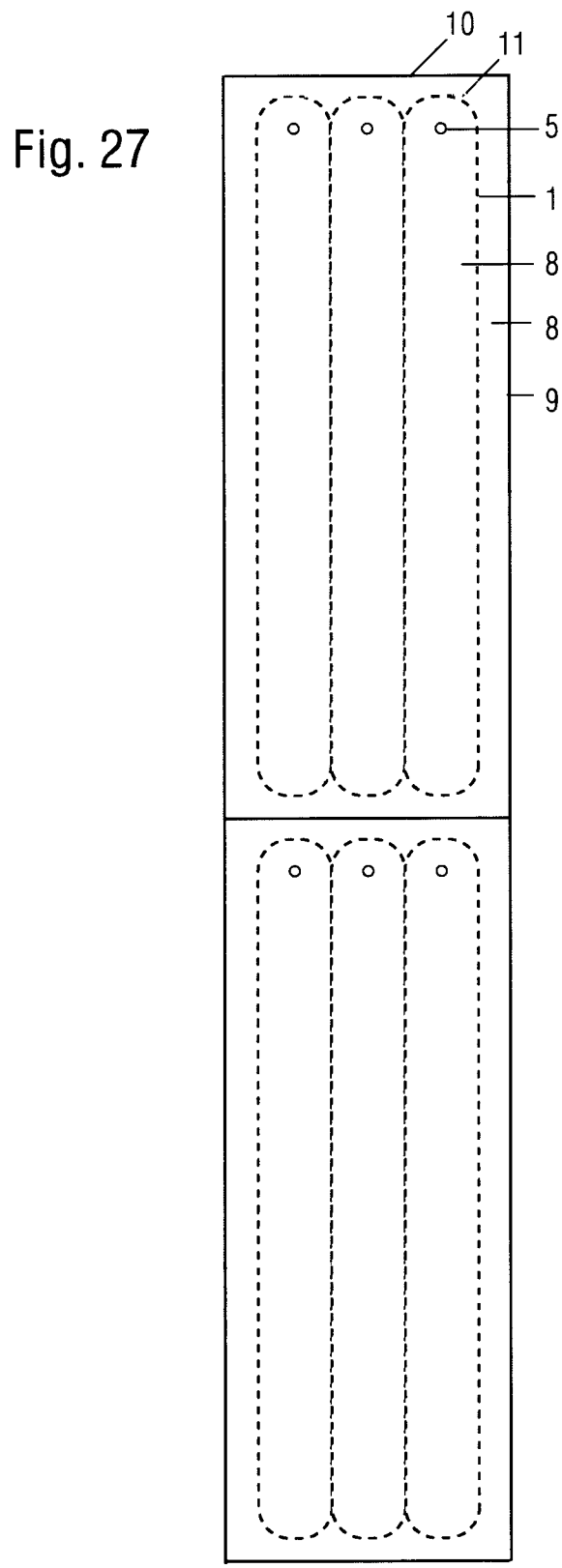

FIG. 27 shows an example of how embodiments of the adaptor such as 1-A can be manufactured in repetition side by side as well as in line as when manufacturing on a roll. Each adaptor 1 is separated by perforated kiss-cuts 11 so to be peeled off the protective backer 9 by the user.

Figure 28:
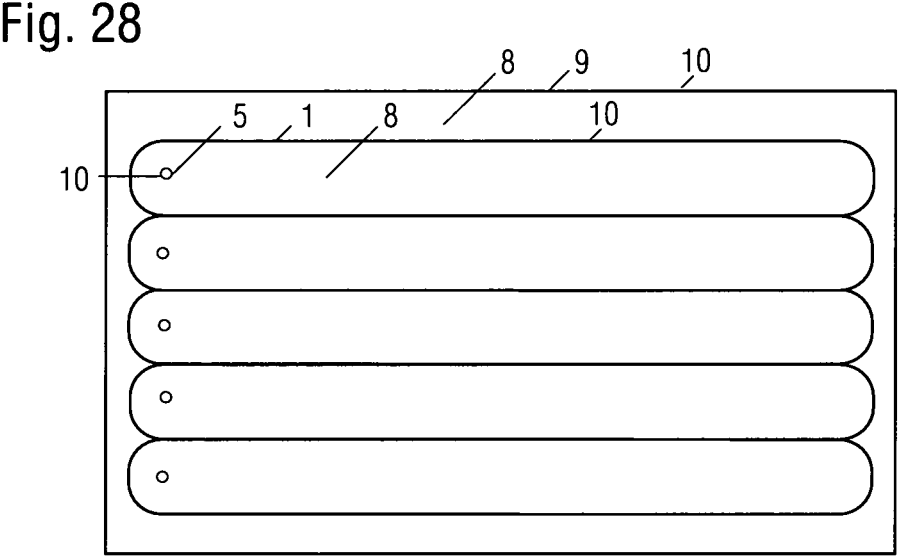

FIG. 28 shows an example of an embodiment of the adaptor such as 1-A repeated five times to fit on a protective backer 9 the size of a common business card.

Figure 29:
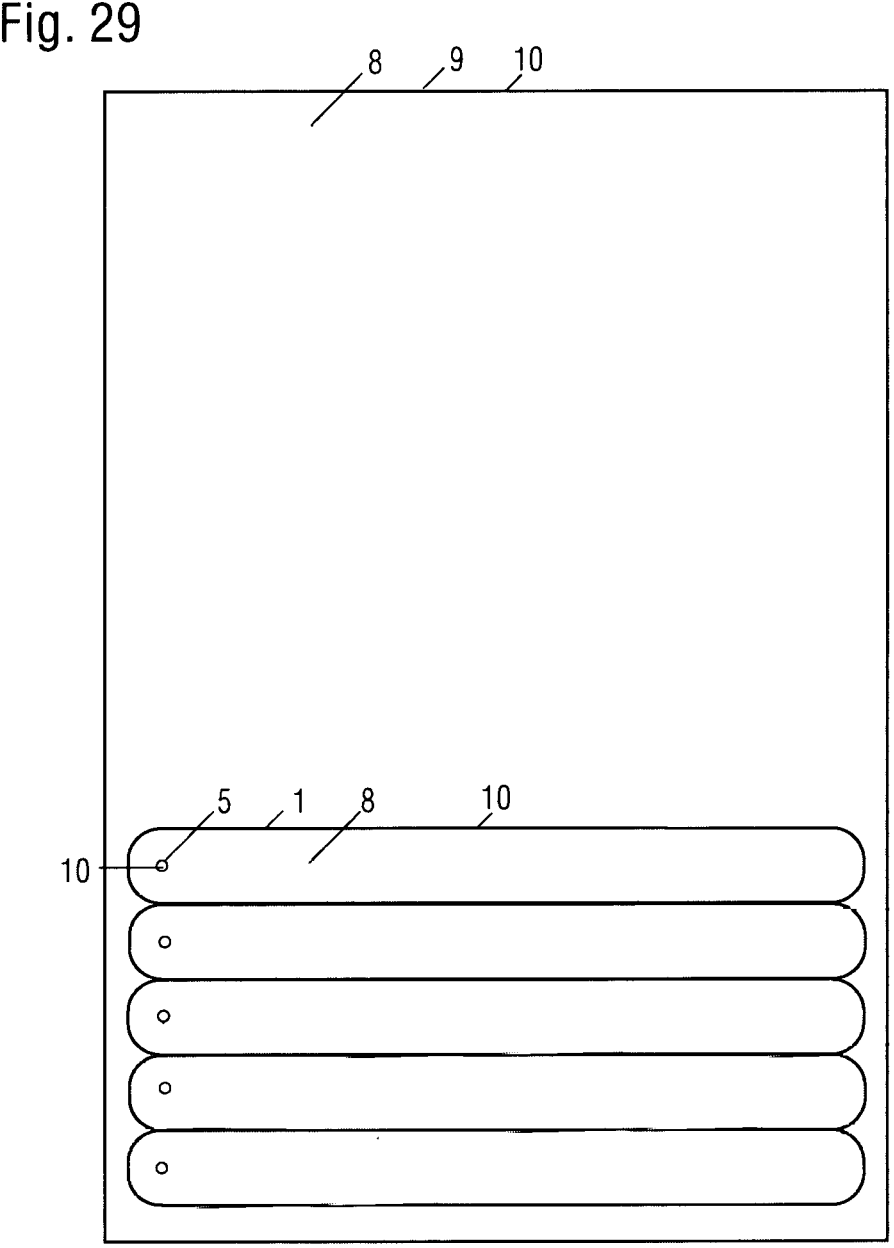

FIG. 29 shows the same as FIG. 26 but with fewer adaptors such as 1-A manufactured on one sheet of protective backer having a size of 4" wide by 6" tall.

Figure 30:
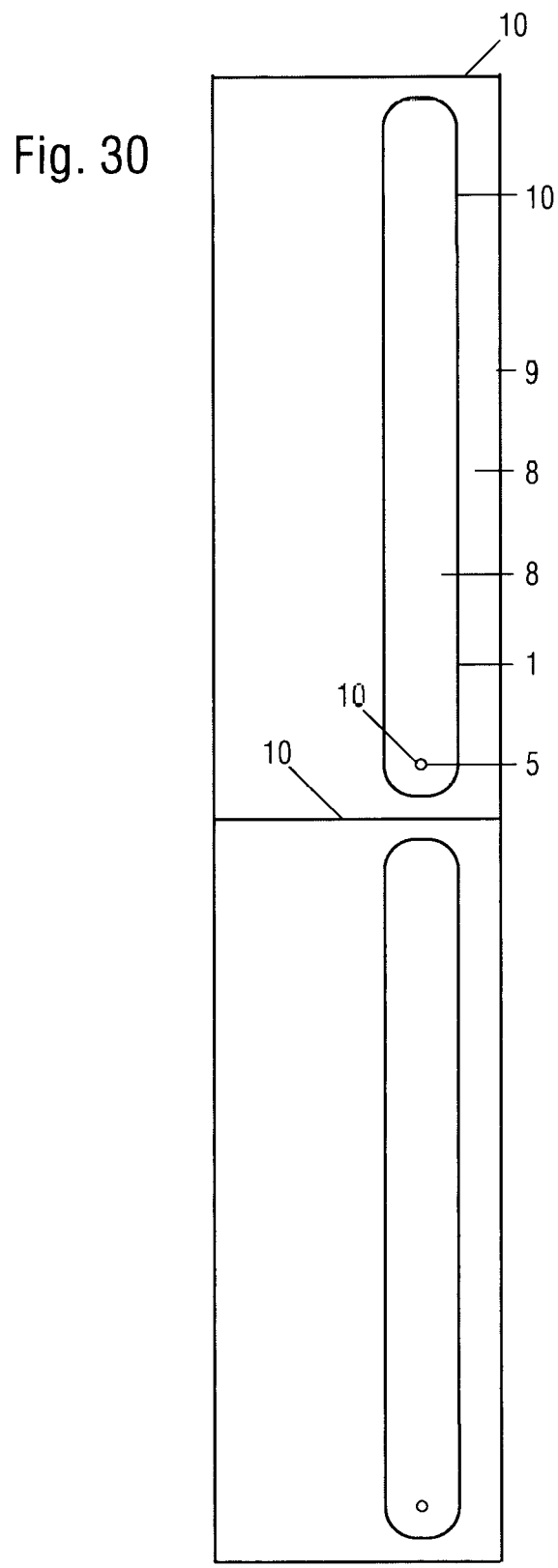

FIG. 30 shows an example of an embodiment of the adaptor such as 1-A repeated but with only one adaptor 1-A to fit on a protective backer 9 with a kiss-cut 10 to separate each.

Figure 31:
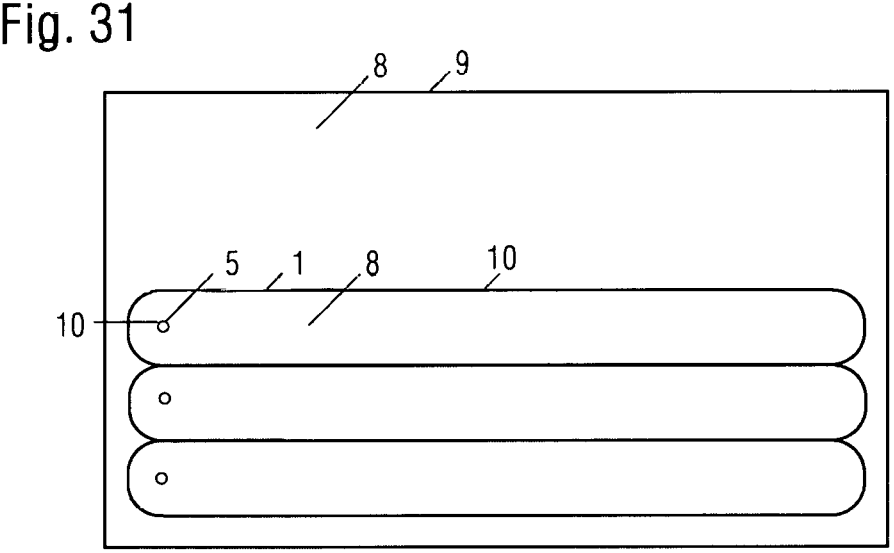

FIG. 31 shows an example of an embodiment of the adaptor such as 1-A repeated three times to fit on a protective backer 9 the size of a common business card.

Figure 32:
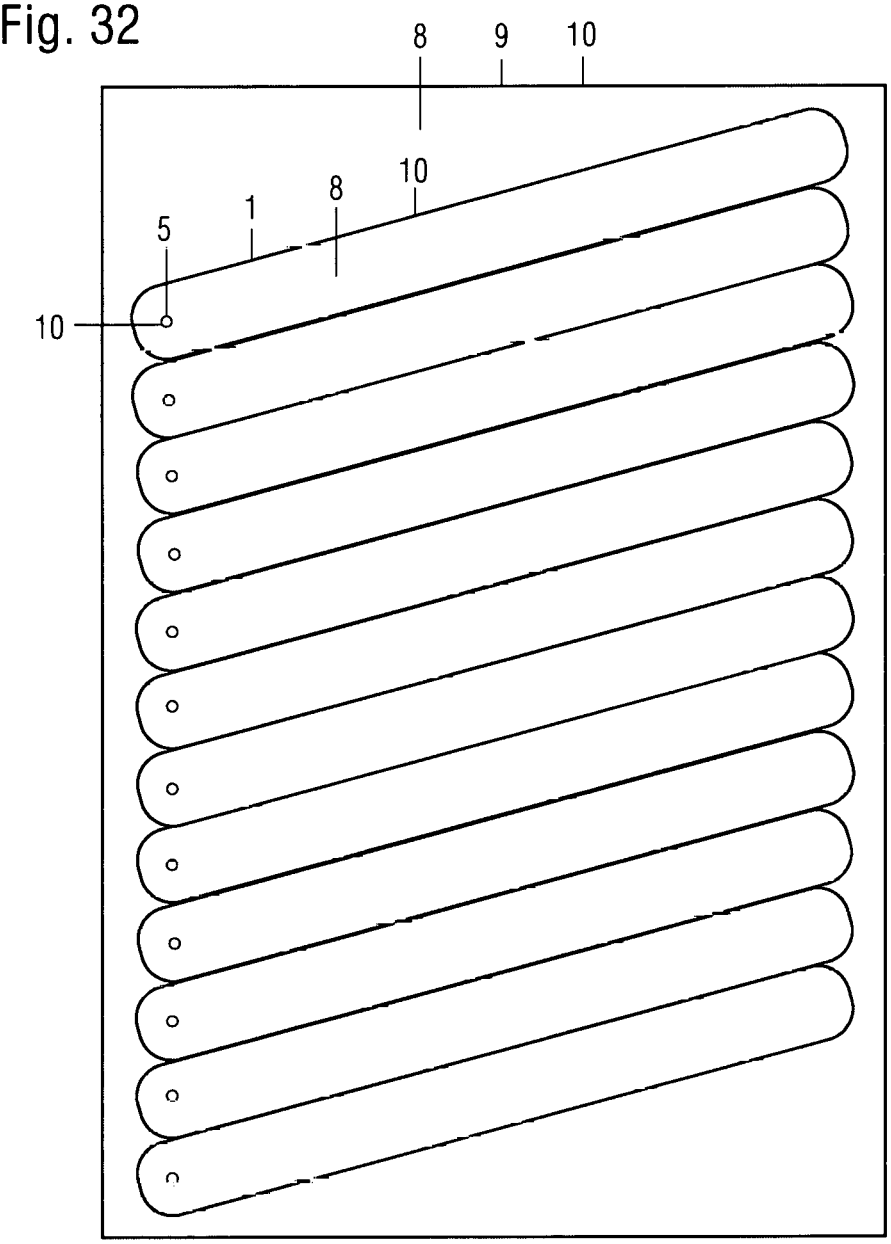

FIG. 32 shows the same as FIG. 26 but with a different positioning of the repeated embodiments of the adaptor such as 1-A each separated by a kiss-cut 10 which does not penetrate the layer of the protective backer 9.

Figure 33:
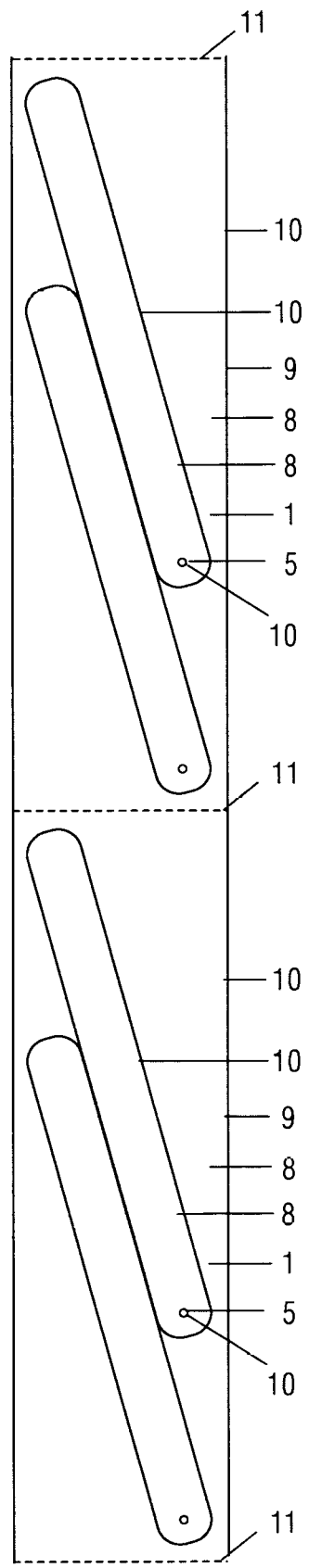

FIG. 33 shows the same as FIG. 27 but with a different positioning of the adaptors such as 1-A and with each group separated by a die-cut or laser cut perforation 10 and each adaptor 1-A separated using a kiss-cut 10.

Figure 34:
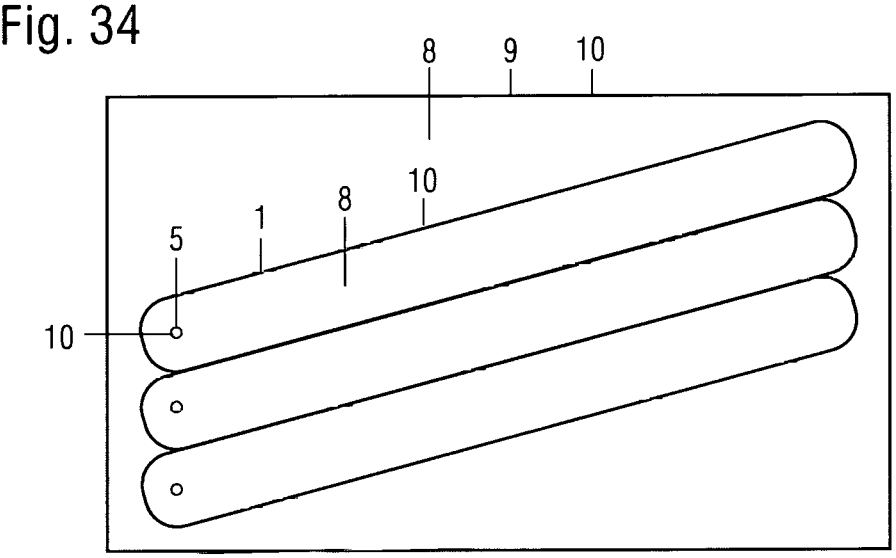

FIG. 34 shows an example of an embodiment of the adaptor such as 1-A repeated three times to fit on a protective backer 9 the size of a common business card with each adaptor 1-A separated from the other by a kiss-cut 10.

Figure 35:
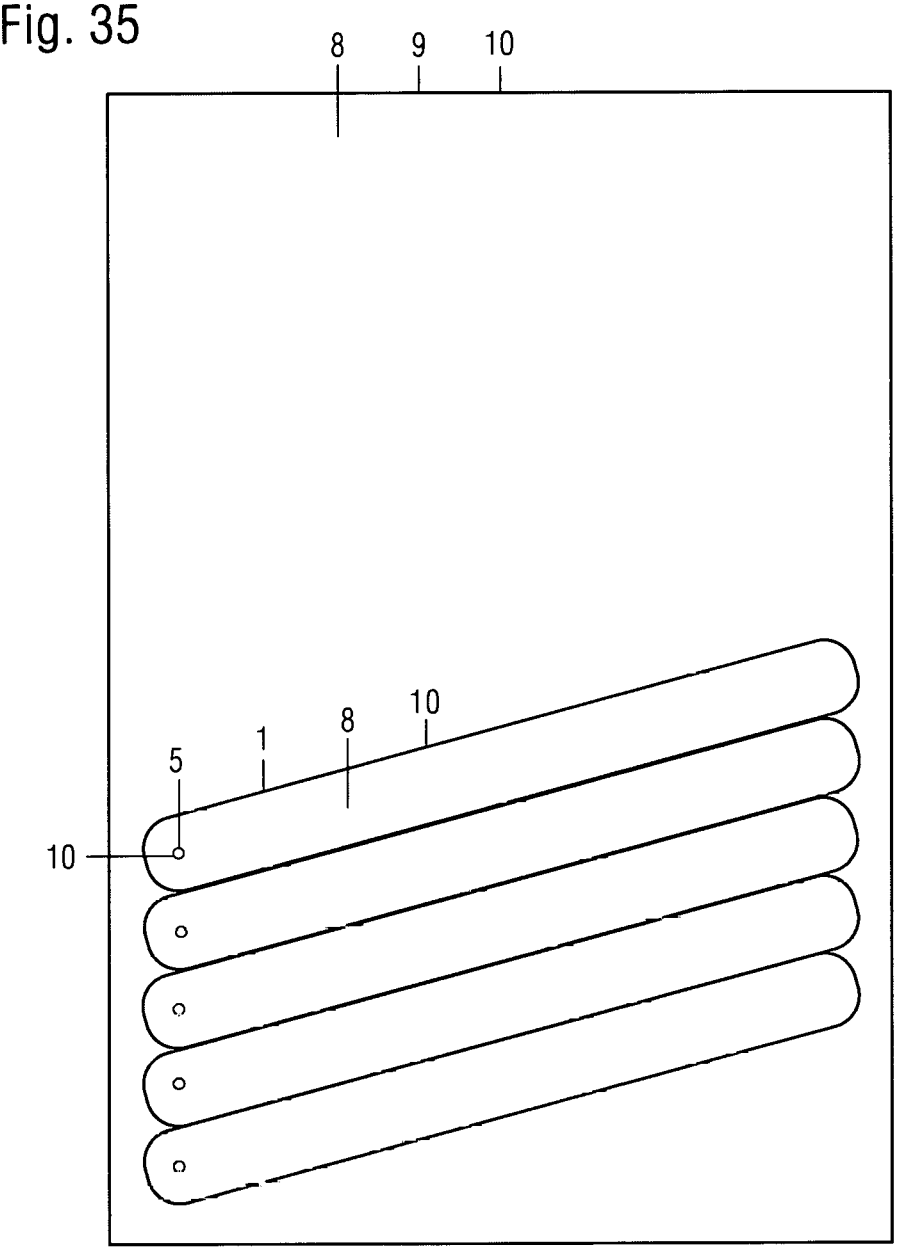

FIG. 35 shows the same as FIG. 29 but with a different positioning of the group of adaptors having the embodiment 1-A on a protective backer 9 measuring for example 4" wide by 6" high.

Figure 36:
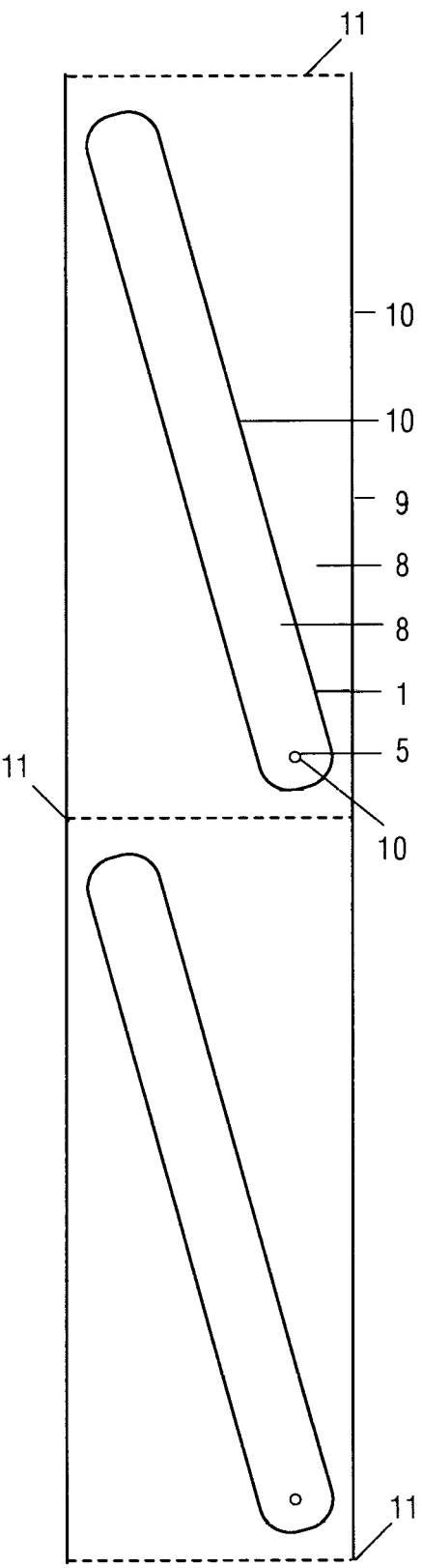

FIG. 36 shows the same as FIG. 33 but with one adaptor embodiment such as 1-A and separated by a die-cut or laser cut perforation 10 and each adaptor 1-A having a kiss-cut 10 to allow the user to peel away from the protective backer 9.

Figure 37:
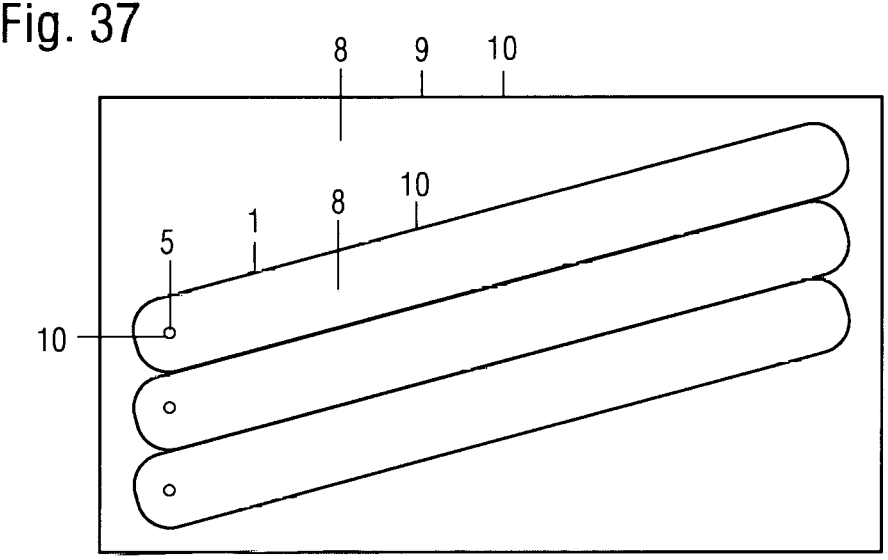

FIG. 37 shows the same as FIG. 34 but with only one adaptor such as 1-A.

Figure 38:
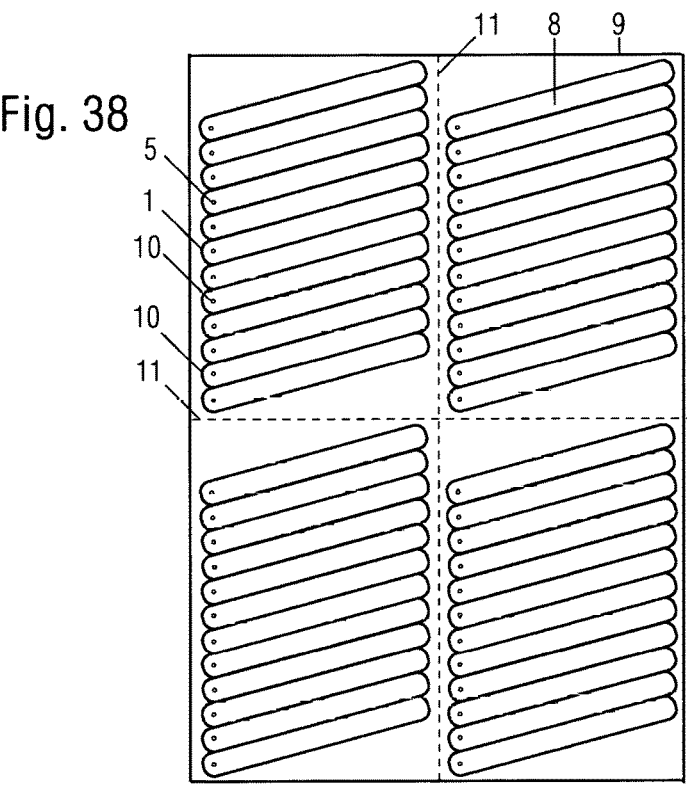

FIG. 38 shows FIG. 32 repeated four times to fit on a letter size sheet (8.5" by 11") and separated by perforations 11.

Figure 39:
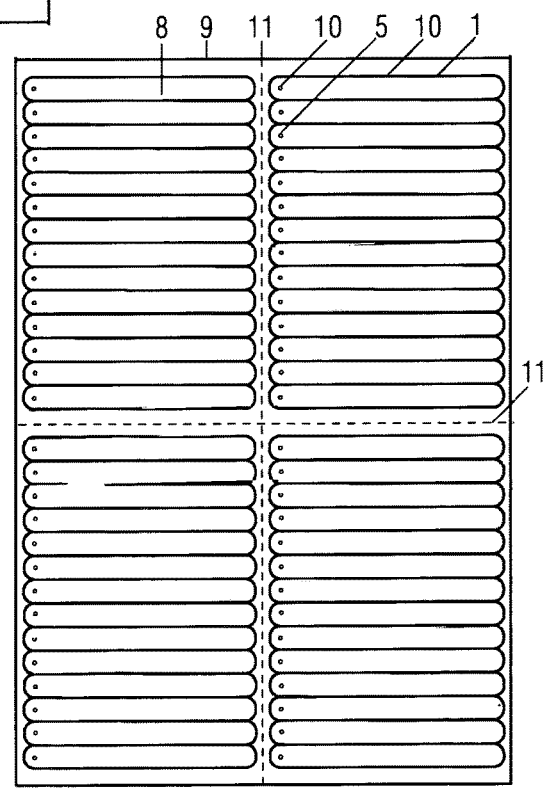

FIG. 39 shows FIG. 26 repeated four times to fit on a letter size sheet (8.5" by 11") and separated by perforations 11.

Figure 40:
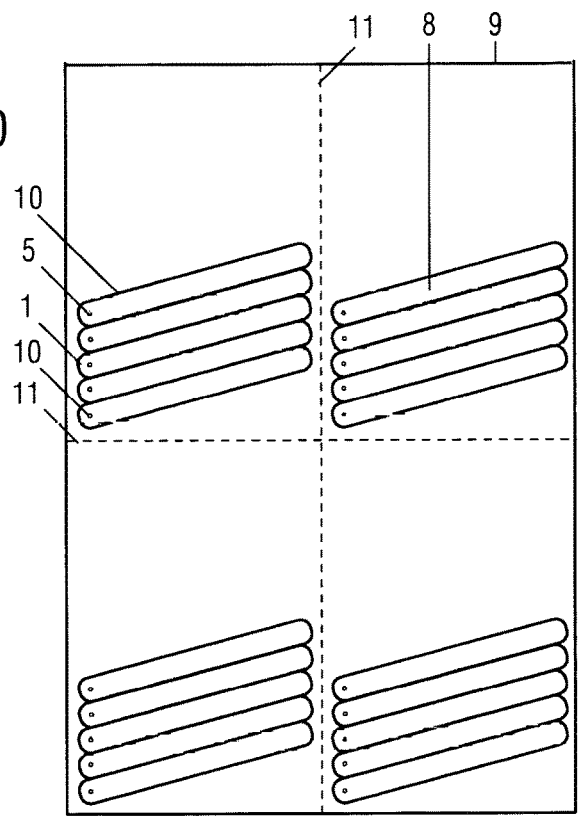

FIG. 40 shows FIG. 35 repeated four times to fit on a letter size sheet (8.5" by 11") and separated by perforations 11.

Figure 41:
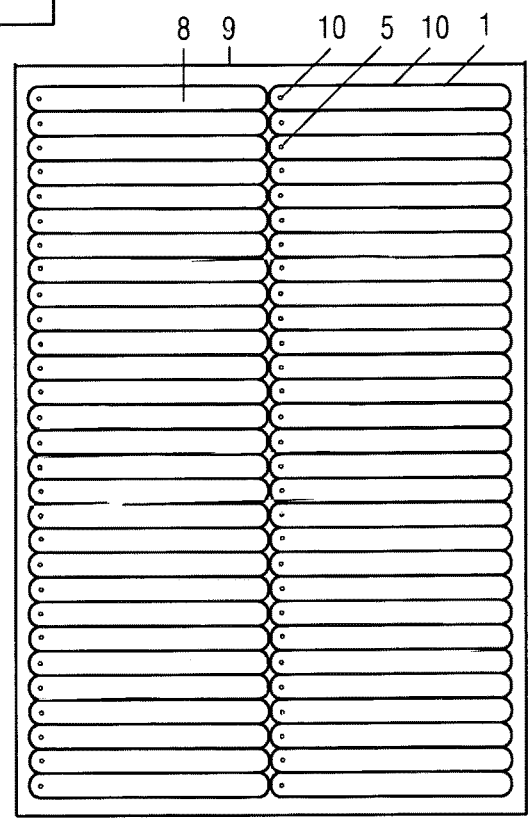
Figure 42A:
FIGS. 42(a)-(d) are side views of adaptors in flat and folded conditions after removal from a roll.
Figure 42B:
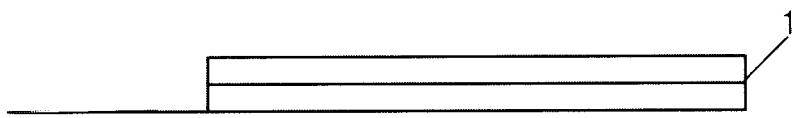
Figure 42C:
Figure 42D:
Figure 43A:
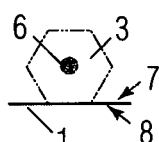
FIGS. 43(a)-(d), 44(a)-(d), 45(a)-(d), and 46(a)-(d) are end views of different adaptors for connection with differently configured writing instruments, respectively.
Figure 43B:
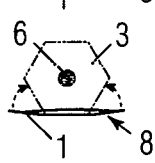
Figure 43C:
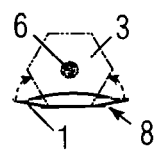
Figure 43D:
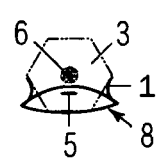
Figure 44A:
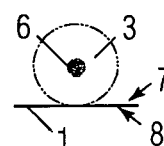
Figure 44B:
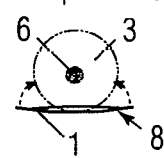
Figure 44C:
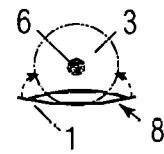
Figure 44D:
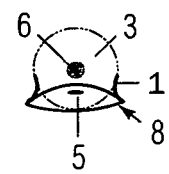
Figure 45A:
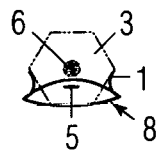
Figure 45B:
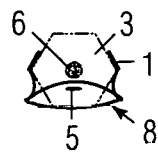
Figure 45C:
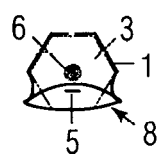
Figure 45D:
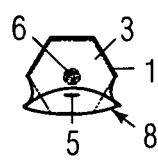
Figure 46A:
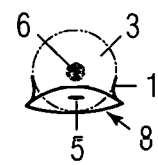
Figure 46B:
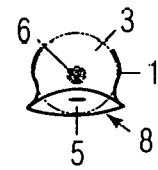
Figure 46C:
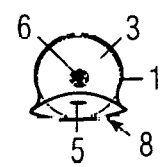
Figure 46D:
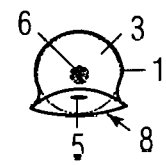

FIG. 41 shows the same as FIG. 39 but without the perforations 11 to maximize the number of adaptors that will fit on a letter size sheet.

FIGS. 42 (a)-(d) show side views of some embodiments of the adaptor 1 that can be folded flat for example those which are manufactured using material in tube form for example the materials listed in FIG. 17.

FIGS. 43(a)-(d) show the same as FIGS. 16(a)-(d).

FIGS. 44(a)-(d) show the same as FIGS. 16(a)-(d) but with a round shaped writing instrument 3.

FIGS. 45(a)-(d) show front views of four different embodiments of the adaptor 1 which are similar to 1-A but have wider widths in order to wrap around the writing instrument 3 to different degrees relying on tension or snugness to hold the adaptor 1 in place on the writing instrument rather than relying on adhesive 7 as is the case with an example of the embodiment of the adaptor 1-A. These illustrations also serve to show that some examples of the embodiments of the adaptors 1 such as those seen in FIGS. 45(a)-(d) through FIGS. 48(a)-(o) can be made having a more rigid or completely rigid structure.

FIGS. 46(a)-(d) show the same as FIGS. 45(a)-(d) but with a round shaped writing instrument 3.

Figure 47A:
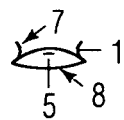
FIGS. 47(a)-(o) show front and top views of the adaptors of FIGS. 45(a)-(d) without the writing instrument in various folding stages.
Figure 47B:
Figure 47C:
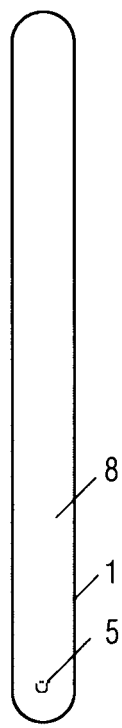
Figure 47D:
Figure 47E:
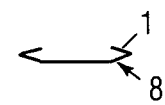
Figure 47F:
Figure 47G:
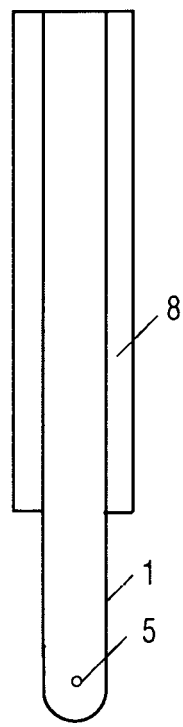
Figure 47H:
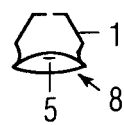
Figure 47:
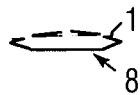
Figure 47J:
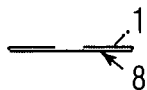
Figure 47L:
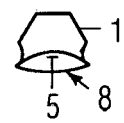
Figure 47K:
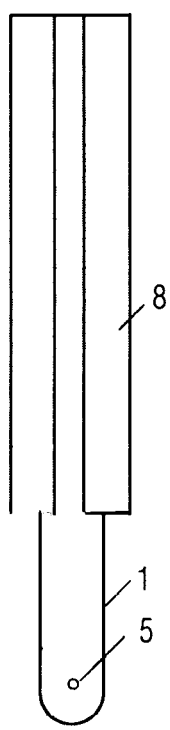
Figure 47M:
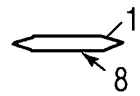
Figure 47N:
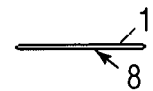
Figure 47O:
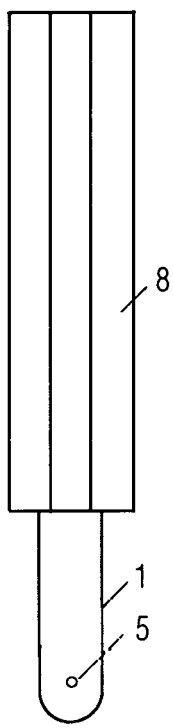

FIGS. 47(a)-(o) show reduced front views of FIGS. 45(a)-(d) but without the writing instrument to show how some embodiments 1 can fold flat as also seen in the overhead views.

Figure 48A:
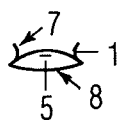
FIGS. 48(a)-(o) show front and top views of the adaptors of FIGS. 46(a)-(d) without the writing instrument in various folding stages.
Figure 48B:
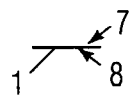
Figure 48C:
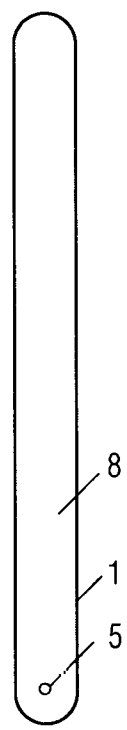
Figure 48D:
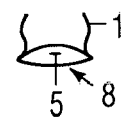
Figure 48E:
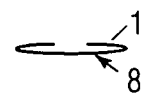
Figure 48F:
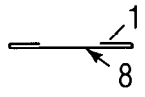
Figure 48G:
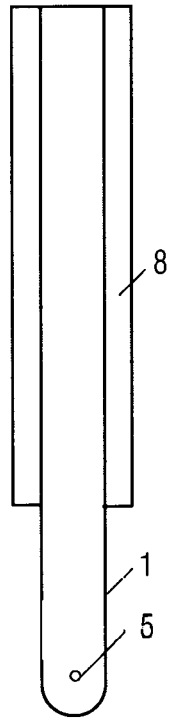
Figure 48H:
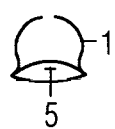
Figure 48:
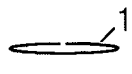
Figure 48J:
Figure 48K:
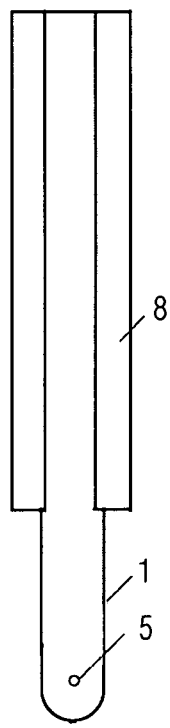
Figure 48L:
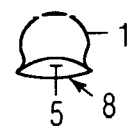
Figure 48M:
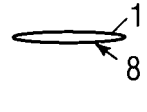
Figure 48N:
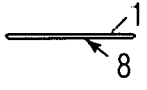
Figure 48O:
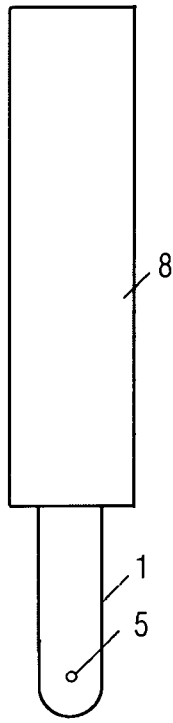

FIGS. 48(a)-(o) show the same as FIGS. 47(a)-(o) but for a round shaped writing instrument 3.

Figure 49A:
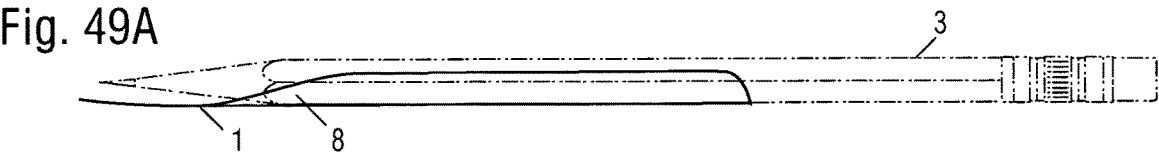
FIGS. 49(a)-(b) and FIGS. 50(a)-(b) are side and end views of the folded adaptor of FIGS. 45(a)-(b) with and without the writing instrument with FIG. 50(c) showing the same views but with a triangular shaped pencil, respectively.
Figure 49B:
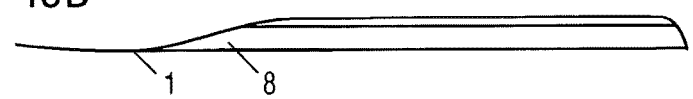

FIGS. 49(a)-(b) show side views of some of the illustrations in FIGS. 45(a)-(d) which can be manufactured, pre-formed (for example, vacuum formed, molded, 3D printed) with or without adhesive 7, which could stick, snap or slide onto a writing instrument 3 or other similarly sized and shaped object.

Figure 50A:
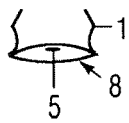
Figure 50B:
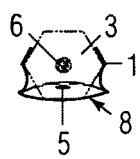
Figure 50C:
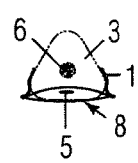

FIGS. 50(a)-(c) show matching front views of FIGS. 49(a)-(b).

Figure 51A:
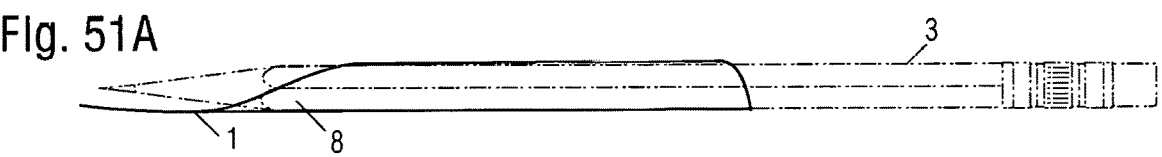
FIGS. 51(a)-(b) and FIGS. 52(a)-(b) are side and end views of the folded adaptor of FIGS. 45(c)-(d) with and without the writing instrument, respectively.
Figure 51B:
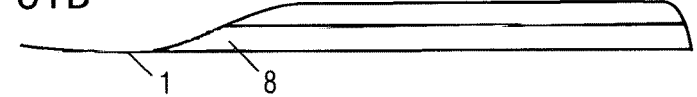

FIGS. 51(a)-(b) show other side views of some of the illustrations in FIGS. 45(a)-(d).

Figure 52A:
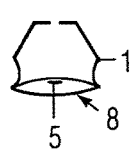
Figure 52B:
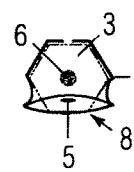

FIGS. 52(a)-(b) show matching front views of FIGS. 51(a)-(b).

Figure 53A:
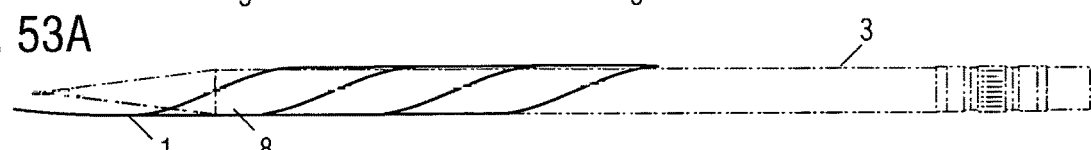
FIGS. 53(a)-(b) and FIGS. 54(a)-(c) are side and end views of a telescopic adaptor with and without a writing instrument, respectively.
Figure 53B:
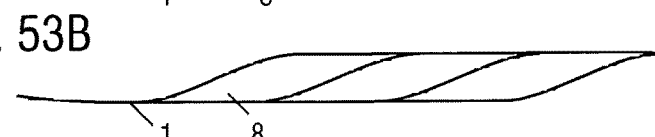

FIGS. 53(a)-(b) show an example of an embodiment of the adaptor 1 that can be telescopic or twisted which could allow for only tension or snugness to keep the adaptor 1 in place or use adhesive 7.

Figure 54A:
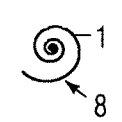
Figure 54B:
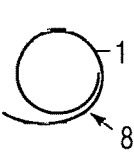
Figure 54C:
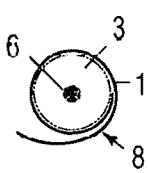

FIGS. 54(a)-(c) show matching front views of FIGS. 53(a)-(b).

Figure 55:
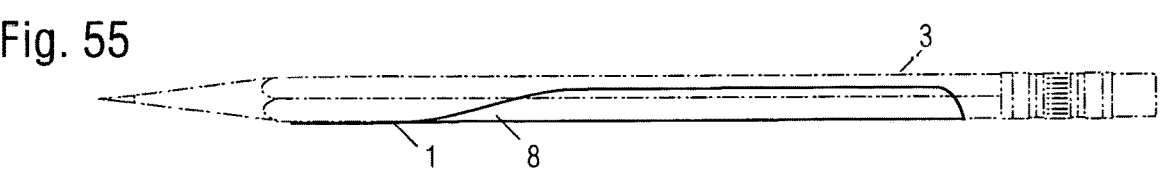
FIG. 55 is a side view of an alternate embodiment for mounting an adaptor on a writing instrument.

FIG. 55 shows that embodiments of the adaptor 1 depending on the way it attaches to the writing instrument 3 can be repositioned by sliding down or peeling away from the writing instrument 3 so it is completely out of the way.

Figure 56:
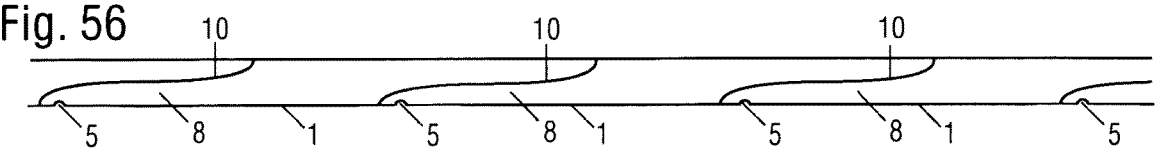
FIG. 56 shows an alternate construction of a plurality of adaptors manufactured from tube stock.

FIG. 56 shows a side view of an embodiment of the adaptor 1 that is manufactured using tube stock such as those mentioned in FIG. 17 and a repetitive die-cut or laser-cut 10 to make the final shape of the embodiment 1 as well as the opening 5.

Figure 57:
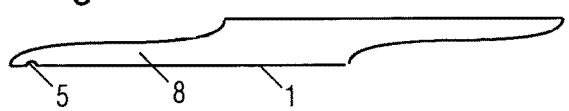
FIGS. 57 and 58 are side and top views, respectively, of a single adaptor from the tube stock of FIG. 56.

FIG. 57 shows the same as FIG. 56 but with one adaptor 1 separated from the others.

Figure 58:
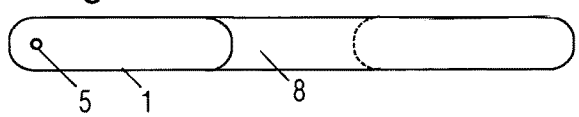

FIG. 58 shows the same as FIG. 57 but is a top view.

Figure 59:
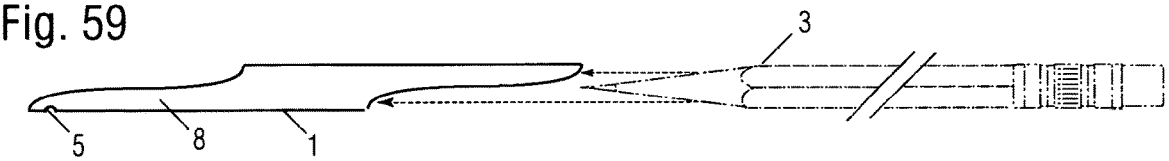
FIGS. 59 and 60 are side views showing alternate methods of connecting the adaptor of FIGS. 57 and 58 with a writing instrument.

FIG. 59 shows the same as FIG. 57 as well as how a pencil 3 attaches to one example of the embodiment of the adaptor 1.

Figure 60:
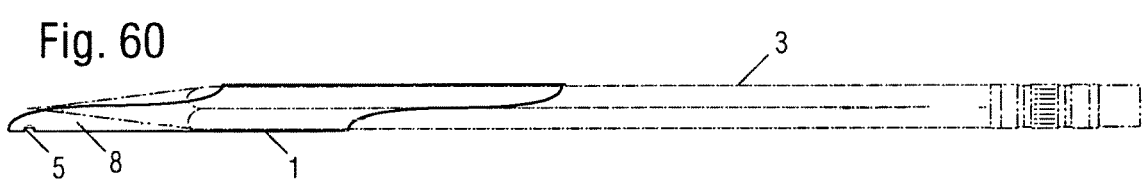

FIG. 60 shows the same as FIG. 57 and with a writing instrument 3, in this case a pencil attached and in proper position.

Figure 61:
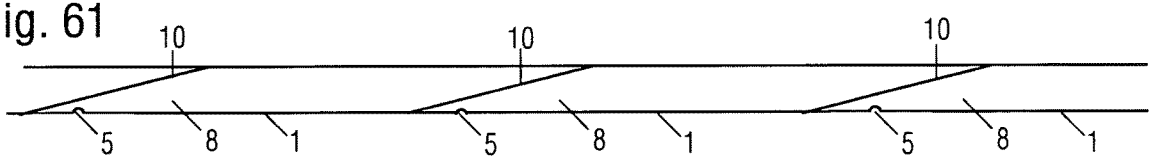
FIG. 61 shows an alternate construction of a plurality of adaptors laser cut from tube stock.

FIG. 61 shows the same as FIG. 56 but with another type of die-cut or laser-cut 10.

Figure 62:
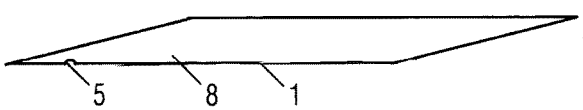
FIGS. 62 and 63 are side and top views, respectively, of a single adaptor from the tube stock of FIG. 61.

FIG. 62 shows the same as FIG. 61 but with one adaptor 1 separated from the others.

Figure 63:
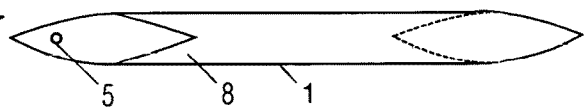

FIG. 63 shows the same as FIG. 62 but is a top view.

Figure 64:
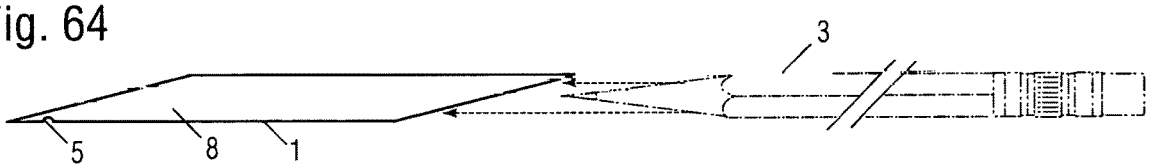
FIGS. 64 and 65 are side views showing alternate methods of connecting the adaptor of FIGS. 62 and 63 with a writing instrument.

FIG. 64 shows the same as FIG. 62 as well as how a pencil 3 attaches to one example of the embodiment of the adaptor 1.

Figure 65:
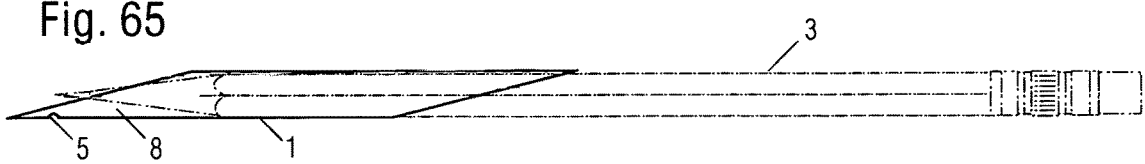

FIG. 65 shows the same as FIG. 62 and with a writing instrument 3, in this case a pencil attached and in proper position.

FIGS. 66(a)-(c) show a bottom, top and side view of another example of an embodiment of the adaptor 1 that can function with another type of writing instrument 3, i.e. a carpenter's pencil 3-B.

FIGS. 67(a)-(c) show a bottom, top and side view of another example of an embodiment of the adaptor 1 that can function with another type of writing instrument 3, i.e. a highlighter 3-C.

Figure 68:
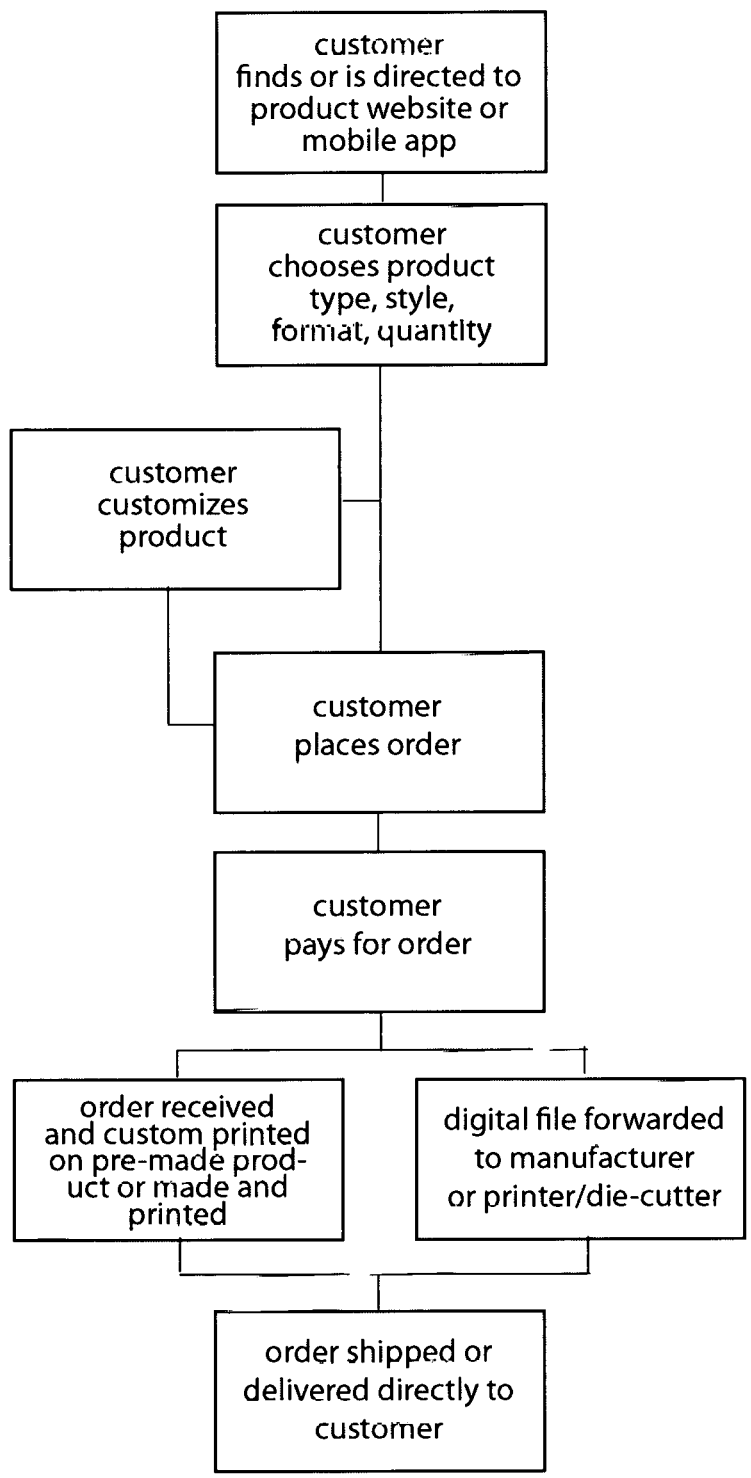
FIG. 68 is a flow chart of the ordering process for adaptors according to the invention.

FIG. 68 shows a flow-chart of the ordering, on-demand manufacturing and direct distribution of the adaptors 1 on the protective sheets 9 for example as those shown in FIG. 22 through 41.

Figure 69A:
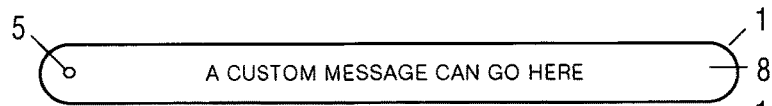
FIGS. 69(a)-(b) and 70(a)-(b) are top and bottom views of adaptors with printed messages thereon.
Figure 69B:

FIGS. 69(a)-(b) show that the top side of the embodiments of the adaptors 1 can be printed on using common printing methods such as silkscreen, inkjet, laser jet, lithograph, engraving and thermal printing. The printing could be custom chosen by the user, for example designs, logos, messages, personal names, quotes or business names, upon direct ordering online through the product website such as seen in FIG. 71 or through a mobile application such as one seen in FIG. 72.

Figure 70A:
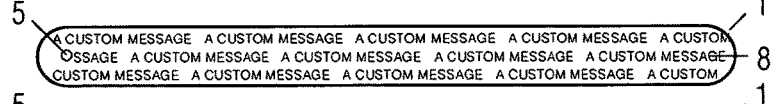
Figure 70B:

FIGS. 70(a)-(b) show the bottom side of the embodiments of the adaptors can be printed on also.

Figure 71:
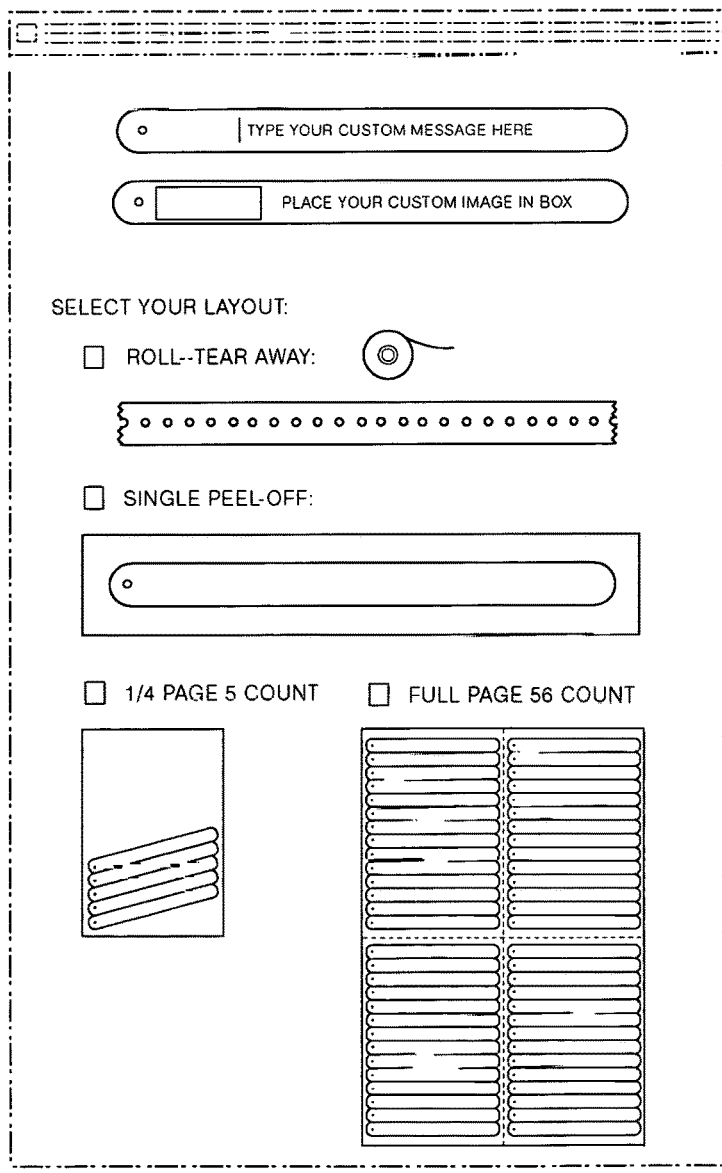
FIGS. 71 and 72 are representations of a web page and mobile app, respectively, for ordering custom adaptors according to the invention.

FIG. 71 shows an example of a product website that allows for customization of embodiments of the adaptor 1 by the user as well as style selection and order placement as describe in FIG. 68.

Figure 72:
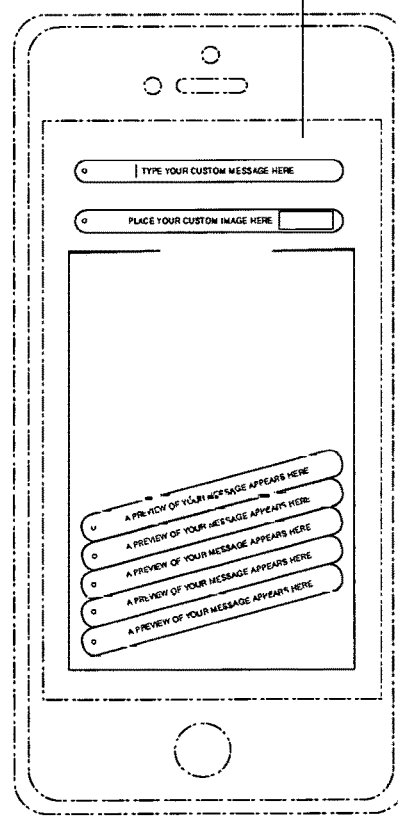

FIG. 72 shows an example of a mobile app for customizing and ordering.

Figure 73:
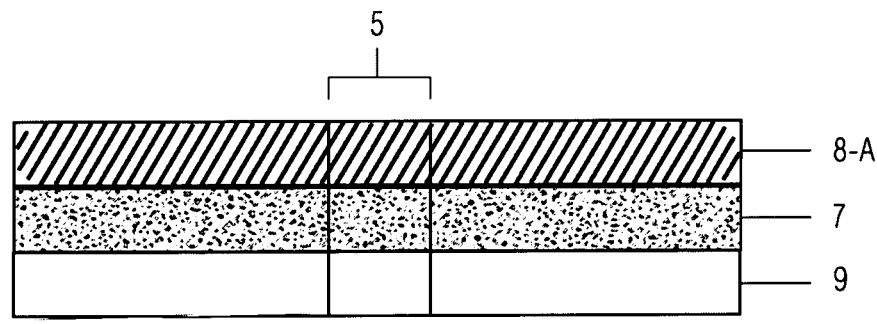
FIGS. 73-76 are sectional views showing the layers of materials used in making various embodiments of adaptors having more than one layer according to the invention.

FIG. 73 shows an enlarged cross-section front view of materials that can be used to manufacture an embodiment of the adaptor 1 with the opening 5 created by cutting through all layers 8-A, 7 and 9 for example using a die-cutting method.

Figure 74:
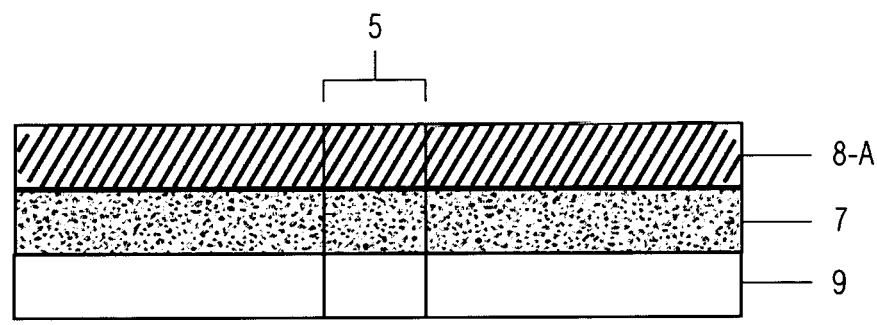

FIG. 74 shows an enlarged cross-section front view of materials that can be used to manufacture an embodiment of the adaptor 1 with the opening 5 created by cutting through layers 8-A and 7 except for the layer protecting the adhesive 9 for example using a die-cutter to kiss-cut through all but one layer 9.

Figure 75:
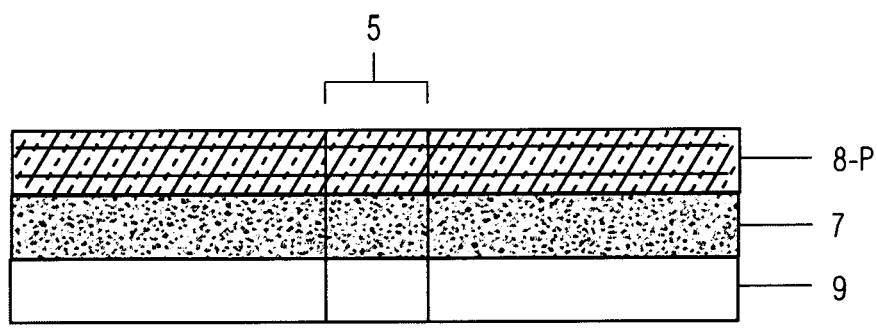

FIG. 75 shows the same as FIG. 74 but with an embodiment of the adaptor 1 manufactured using a different combination of materials, for example, 8-P, 7 and 9.

Figure 76:
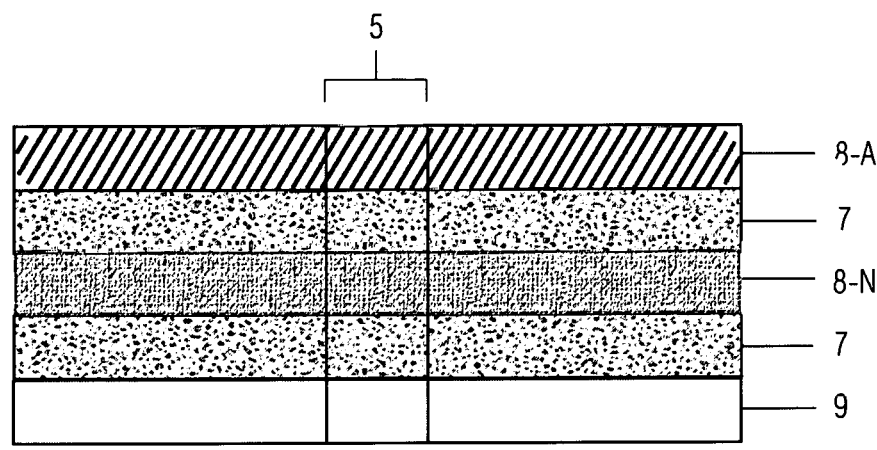

FIG. 76 shows the same as FIG. 74 but with an embodiment of the adaptor 1 manufactured using a combination of materials 8-P, 7 and 9 with an added layer 8-N added for more rigidity.

Figure 77:
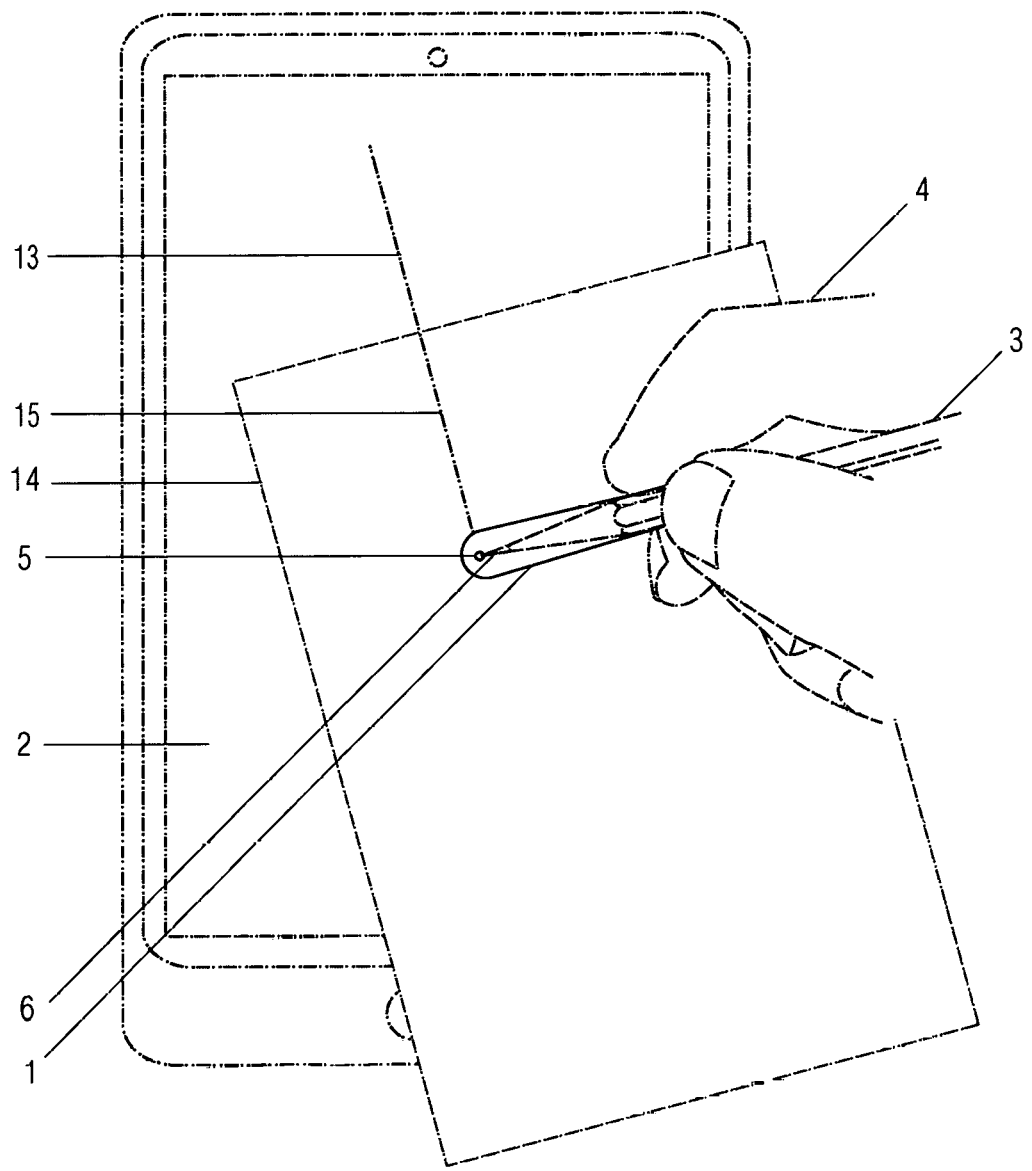
FIGS. 77 is a schematic drawing illustrating use of the adaptor according to the invention.

FIG. 77 shows that the adaptor 1 can operate (i.e. select apps, select key strokes, write or draw 13) a device having a capacitive screen 2 and then immediately allow the writing instrument 3 to mark, write or draw 15 on paper 14 as well as allow the writing instrument 3 to mark, write or draw 15 simultaneously on paper 14 and to mark, write or draw 13 on screen 2 when paper 14 is laid over the capacitive screen of the device 2 without disruption or interference.

Figure 78:
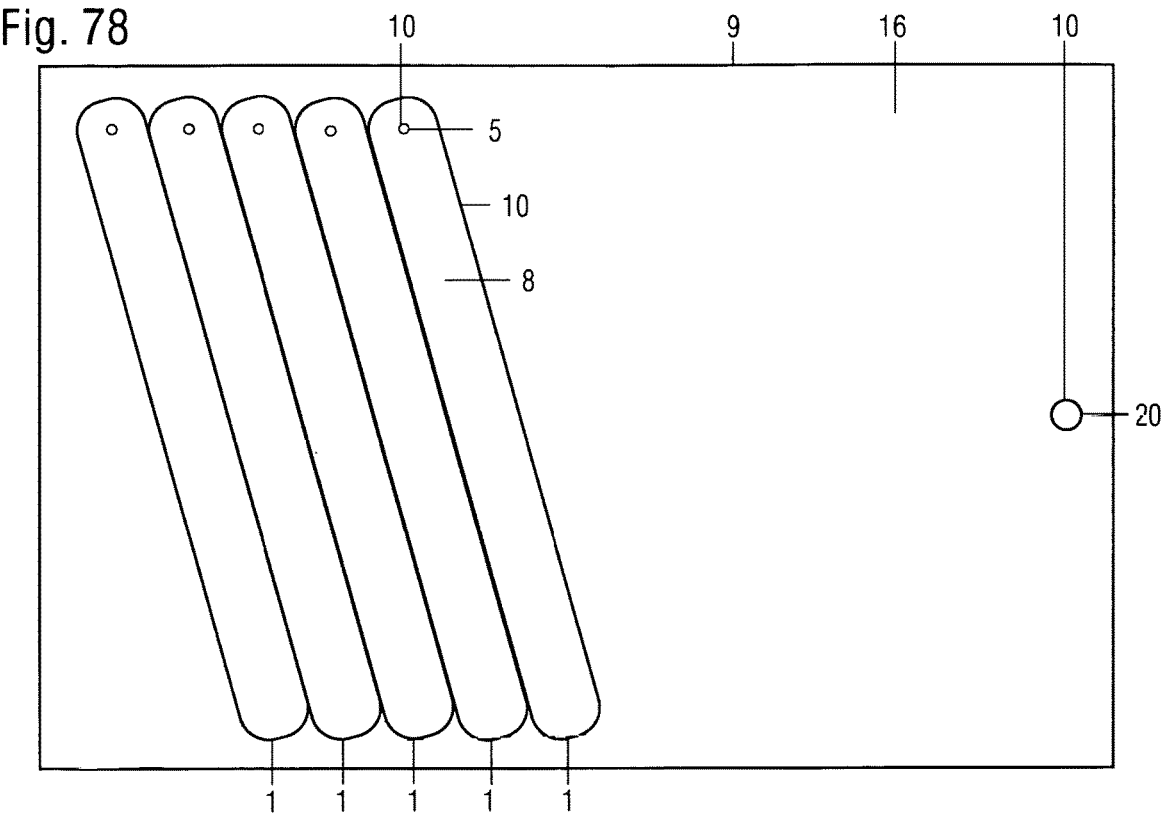
FIGS. 78 and 79 are front and rear views of packaging and shipping embodiments for the adaptor according to the invention.

FIG. 78 shows the same as FIG. 35 and shows the area around the products 1 available for printing the product name, information, description and instructions 16 and also marks the location for an opening (i.e. a circle or other shape) 20 used to hang the packaged product FIG. 78 on a retail display system. This is the front side of the packaging as mentioned above which holds at least one adaptor 1 and meeting U.S. Mail size specifications. The opposite side to FIG. 78 is FIG. 79.

Figure 79:
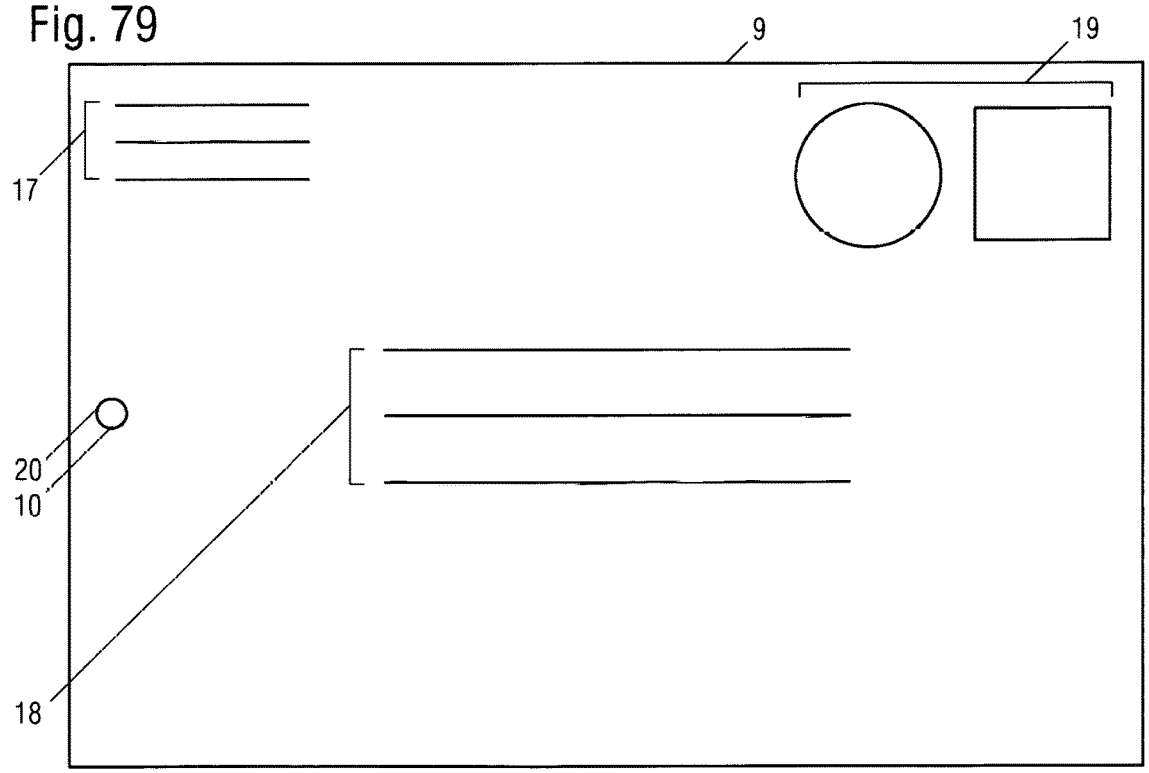

FIG. 79 shows the reverse side of FIG. 78 and the area for printing a return address 17, the area for printing the shipping address 18 as well as the area for printing the postage.

Due to the thinness of the various embodiments of the adaptor, it can be stored fully concealed between a mobile electronic touch screen device 2 and its protective case. The embodiment shown in FIG. 3 for example is also thin enough to fit inside a wallet, book or notebook. Other embodiments, due to their combination of the adhesive 7 side used to attach to the writing instrument 3 and thin profile, can be temporarily adhered to the back or side of other objects (i.e. a mobile phone 2 or book jacket) for storage until future use without interfering with the ergonomics of the object. The adaptor can also be stored on the writing instrument 3 simply by repositioning it further up the instrument and away from its tip as seen in FIG. 55.

Due to the flexibility of some of the various materials used to make the adaptor as shown in FIG. 17, the adaptor is capable of silent operation on a capacitive surface 2 (i.e. with no tapping sound when the adaptor 1 strikes the screen of the device).

The materials used in the manufacture and packaging for retail display, labeling and shipping can be the same. For example, an adaptor 1 and a protective backer 9 as described in connection with FIG. 78 and FIG. 79 can be mailed or shipped without the need for any other material or packaging.

While the preferred forms and embodiments have been illustrated and described, it will be apparent to those of ordinary skill in the art that various changes and modifications may be made without deviating from the inventive concepts set forth above.

What is claimed is:

1. A writing utensil stylus adaptor, comprising only an electrically conductive elongated strip having a first end removably connected with the writing utensil and a second end extending beyond a writing portion of the writing utensil, said strip cooperating with a capacitive touch screen for operation of a device while still affording operation of the writing utensil on paper without removing said strip.

2. A writing utensil stylus adaptor as defined in claim 1, wherein said strip is formed of a flexible material and has a thickness to render said strip pliable, whereby when said strip is connected with the writing utensil, it conforms with the configuration of said writing utensil and said strip second end can be bent to cover the writing portion of the writing utensil.

3. A writing utensil stylus adaptor as defined in claim 2, wherein said strip includes an adhesive layer.

4. A writing utensil stylus adaptor as defined in claim 1, wherein said strip first end is formed of a rigid material and said strip second end is formed of a flexible material, whereby when said strip is connected with the writing utensil, said strip second end can be bent to cover the writing portion of the writing utensil.

5. A writing utensil adaptor as defined in claim 4, wherein said strip first end is resilient to provide a snap-fit for fastening the adaptor to a writing utensil.

6. A writing utensil stylus adaptor as defined in claim 1, wherein said strip first end contains at least one opening for receiving the writing portion of the writing utensil.

7. A writing utensil stylus adaptor as defined in claim 6, wherein said opening is arranged in spaced relation from edge portions of said strip.

8. A writing utensil stylus adaptor as defined in claim 6, wherein said opening extends from a side edge of said strip.

9. A writing utensil stylus adaptor as defined in claim 1, wherein said strip is one of die-cut, laser cut, or rotary cut from an adhesive sheet.

10. A writing utensil stylus adaptor as defined in claim 9, wherein a plurality of strips is cut from said adhesive sheet.

11. A writing utensil stylus adaptor as defined in claim 1, wherein said strip opposite a layer of adhesive is printed with at least one of text or design.

12. A writing utensil stylus adaptor as defined in claim 1, wherein said strip comprises multiple layers of flexible material adhesively bonded together.

13. A writing utensil stylus adaptor as defined in claim 1, wherein said strip comprises rigid material having at least one living hinge.

14. A writing utensil stylus adaptor as defined in claim 1, wherein said strip cooperating with a capacitive touch screen for operation of a device while simultaneously affording operation of the writing utensil when paper is placed on top of said touch screen.

* * * * *